(12) United States Patent
Heaton et al.

(10) Patent No.: US 11,561,833 B1
(45) Date of Patent: Jan. 24, 2023

(54) ALLOCATION AND PLACEMENT OF RESOURCES FOR NETWORK COMPUTATION

(71) Applicant: Amazon Technologies, Inc., Seattle, WA (US)

(72) Inventors: Richard John Heaton, San Jose, CA (US); Randy Renfu Huang, Morgan Hill, CA (US); Drazen Borkovic, Los Altos, CA (US); Jindrich Zejda, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1246 days.

(21) Appl. No.: 16/021,866

(22) Filed: Jun. 28, 2018

(51) Int. Cl.
G06F 9/50 (2006.01)
G06F 9/54 (2006.01)
G06F 9/38 (2018.01)
G06N 3/04 (2006.01)

(52) U.S. Cl.
CPC .......... *G06F 9/5016* (2013.01); *G06F 9/3836* (2013.01); *G06F 9/50* (2013.01); *G06F 9/5005* (2013.01); *G06F 9/5022* (2013.01); *G06F 9/5061* (2013.01); *G06F 9/5077* (2013.01); *G06F 9/544* (2013.01); *G06N 3/0454* (2013.01)

(58) Field of Classification Search
CPC ...... G06F 9/5016; G06F 9/3836; G06F 9/544; G06F 9/50; G06F 9/5005; G06F 9/5022; G06F 9/5061; G06F 9/5077; G06N 3/04; G06N 3/08

See application file for complete search history.

(56) References Cited

U.S. PATENT DOCUMENTS

| | | | | |
|---|---|---|---|---|
| 10,685,295 | B1 * | 6/2020 | Ross | G06N 20/00 |
| 10,699,186 | B2 * | 6/2020 | Craddock | G06N 3/063 |
| 2018/0285715 | A1 * | 10/2018 | Son | G06N 3/08 |
| 2018/0300601 | A1 * | 10/2018 | Cedola | H03M 7/6005 |
| 2019/0286973 | A1 * | 9/2019 | Kovvuri | G06N 3/04 |
| 2019/0295114 | A1 * | 9/2019 | Pavletic | G06K 9/6256 |
| 2019/0303197 | A1 * | 10/2019 | Li | G06K 9/6217 |

* cited by examiner

*Primary Examiner* — Charles M Swift
(74) *Attorney, Agent, or Firm* — Kilpatrick Townsend & Stockton LLP

(57) ABSTRACT

Techniques for operating a computing system to perform neural network operations are disclosed. In one example, a method comprises receiving a neural network model, determining a sequence of neural network operations based on data dependency in the neural network model, and determining a set of instructions to map the sequence of neural network operations to the processing resources of the neural network processor. The method further comprises determining, based on a set of memory access operations included in the set of instructions, a first set of memory references associated with a first location of an external memory to store the input data and a second set of memory references associated with a second location of the external memory to store the output data, and generating an instruction file including the set of instructions, the first set of memory references and the second set of memory references.

20 Claims, 14 Drawing Sheets

ALLOCATION AND PLACEMENT OF RESOURCES FOR NETWORK COMPUTATION

BACKGROUND

Artificial neural networks are computing systems with an architecture based on biological neural networks. Artificial neural networks can be trained, using training data, to learn about how to perform a certain computing task.

A neural network may include a set of processing nodes. Each processing node can process a piece of the input data based on a weight to generate an output, and the final decision can be generated based on a combination of the outputs of the set of processing nodes. As part of the processing, each processing node can perform a set of arithmetic operations such as, for example, floating-point multiplications and additions involving the weights and the input data. A neural network may be implemented by circuitries and data paths, such as a systolic array, to perform computations including the arithmetic operations. The neural network processing can also be supported by memory circuits to provide storage of input data, output data, as well as intermediate output data for the computations. The throughput of neural network processing may depend on how efficiently various computation and memory resources are allocated and placed for the neural network processing.

BRIEF DESCRIPTION OF THE DRAWINGS

Various embodiments in accordance with the present disclosure will be described with reference to the drawings, in which.

DETAILED DESCRIPTION

Figure 1:
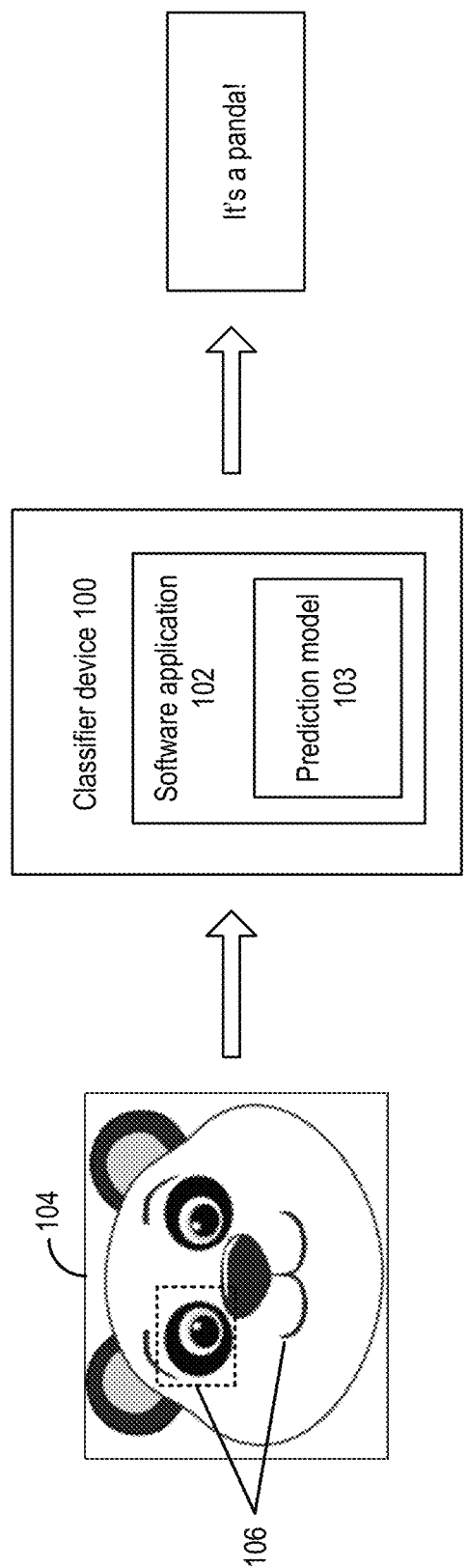
FIG. 1 illustrates an example a classifier device that uses techniques disclosed herein to process data.

Embodiments of the present disclosure relate to allocating and placing resources of a computing environment for performing neural network processing operations of data. The computing environment comprises a memory device, a compiler engine, a runtime engine, and a neural network processor. The neural network processor may include internal memory and an array of processing elements to perform neural network computations. The compiler engine and the runtime engine may operate in different computing systems of the computing environment. The compiler engine can allocate the memory and computation resources for the neural network processing operations, and provide information about the allocated memory and computation resources to the runtime engine. The runtime engine may perform placement of the allocated memory and computation resources to perform the neural network processing operations.

More specifically, as part of resource allocation, the compiler engine may generate a set of instructions to be provided to the neural network processor. The set of instructions may be generated based on a neural network model to be used to process input data, and correspond to a sequence of operations. The sequence of operations may include, for example, operations to be performed at pre-determined external memory locations such as retrieval of input data and storage of output data. The sequence of operations may also include operations to be performed at pre-determined internal memory locations such as storage of input data, intermediate output data, and output data. The sequence of operations may further include operations to be performed at pre-determined process elements such as fetching of the input data from the internal memory, computation operations, and storage of intermediate output data and output data at the internal memory. For the set of operations to be performed at an external memory, the compiler engine can include a set of memory references (e.g., direct memory access (DMA) descriptors) for accessing the external memory. By referencing to the external and internal memories as well as the computation resources involved in the neural network processing, the set of operations can convey information about the memory and computation resources allocated for the neural network processing.

Moreover, the runtime engine may perform resource placement based on the set of instructions and upon receiving a request from a host device to perform the neural network processing operations. For example, upon receiving the request, the runtime engine may select the aforementioned neural network processor and the memory device from a set of available neural network processors and memory devices to provide, respectively, the computation and memory resources for the requested neural network processing. The runtime engine can allocate a memory space in the selected memory device to become a staging area for the neural network processing operations. The staging area may be used to store the set of instructions, the input data for the neural network processing operations, and the output data to be generated by the neural network processing operations. The runtime engine can map the memory references included in the instructions to the memory addresses in the staging area for the input data and the output data. The runtime engine can also control the selected neural network processor to fetch the input data and the instructions from the staging area, and to perform the computations based on the instructions.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold. Due to the combination of scaled elements between layers, the sizes of the higher layers (e.g., the output layer, the intermediate layers immediately before the output layer, etc.) typically are smaller than the sizes of the lower layers (e.g., the input layer, the intermediate layers immediately after the input layer, etc.).

A neural network processor can be programmed to perform computations based on an artificial neural network model. A neural network processor can be programmed based on a sequence of instructions that include computation operations (e.g., adding, multiplication, processing of activation function, etc.) associated with the model. The instructions may also access internal and external memory devices to obtain and store data. A compiler may receive information about the neural network model, the input data, and the available memory and computation resources, and generate the set of instructions to indicate, for example, when to access the internal and external memory devices for the data, which component of the neural network processor to perform computations on the data based on the neural network model, etc., to perform the neural network processing. The compiler may generate the set of instructions upon receiving a request (e.g., from a host device) to perform the neural network processing, and provide the set of instructions to the neural network processor for execution. The neural network processor can be programmed differently to, for example, apply different neural network models, to process different input data, etc., for different neural network processing operations.

Although such arrangements provide flexibility in deploying the neural network processor to handle different neural network processing operations (e.g., by applying different neural network models, for different input data, etc.), it may take a relatively long time for the compiler to parse the neural network model, and to determine the available computation and memory resources, in order to generate the set of instructions. The compilation time may introduce a large delay between when the system receives the request from a user to perform the neural network processing and when the system can provide the output back to the user. Such a delay can reduce the responsiveness of the system and degrade user experience.

Embodiments of the present disclosure relate to an apparatus for performing neural network processing operations of data. The apparatus comprises a memory device, a controller comprising a compiler engine and a runtime engine, and a neural network processor. The neural network processor may include internal memory and an array of processing elements to perform neural network computations. The compiler engine can allocate the memory and computation resources for the neural network processing operations, and provide information about the allocated memory and computation resources to the runtime engine. The runtime engine may perform placement of the allocated memory and computation resources to perform the neural network processing operations More specifically, as part of resource allocation, the compiler engine may generate a set of instructions to be provided to the neural network processor. The set of instructions may be generated based on a neural network model to be used to process input data, and may correspond to a sequence of operations. The sequence of operations may include, for example, operations to be performed at pre-determined external memory locations such as retrieval of input data and storage of output data. The sequence of operations may also include operations to be performed at pre-determined internal memory locations such as storage of input data and intermediate output data and output data. The sequence of operations may further include operations to be performed at pre-determined process elements such as fetching of the input data from the internal memory, computation operations, and storage of intermediate output data and output data at the internal memory. For the set of operations to be performed at an external memory, the compiler engine can include a set of memory references (e.g., direct memory access (DMA) descriptors) for accessing the external memory. By referencing the external and internal memories as well as the computation resources involved in the neural network processing, the set of operations can convey information about the memory and computation resources allocated for the neural network processing.

Moreover, the runtime engine may perform resource placement based on the set of instructions and upon receiving a request from a host device to perform the neural network processing operations. For example, upon receiving the request, the runtime engine may select the aforementioned neural network processor and the memory device from a set of available neural network processors and memory devices to provide, respectively, the computation and memory resources for the requested neural network processing. The runtime engine can allocate a memory space in the selected memory device to become a staging area for the neural network processing operations. The staging area may be used to store the set of instructions, the input data for the neural network processing operations, and the output data to be generated by the neural network processing operations. The runtime engine can map the memory references included in the instructions to the memory addresses in the staging area for the input data and the output data. The runtime engine can also control the selected neural network processor to fetch the input data and the instructions from the staging area, and to perform the computations based on the instructions.

Compared with a case where a compiler handles both resource allocation and resource placement, embodiments of the present disclosure enable decoupling (e.g., in time) of resource allocation and resource placement, which can reduce the processing delay. For example, before the system receives a request to perform certain neural network processing operations, the compiler can generate a set of instructions for programming a neural network processor to perform the neural network processing. The set of instructions may specify the memory resources (internal memories, external memories, or both) and the computation resources (e.g., by specifying which processing element(s) should receive which data, and the sequence of computations) to be allocated for the neural network processing, without being tied to a particular memory device and/or a particular neural network processor. After the system receives the request, the runtime engine can perform dynamic placement of the allocated resources based on the set of instructions. For example, the runtime engine can determine, from a plurality of neural network processors, a neural network processor to execute the instructions. The runtime engine can also select an external memory device to stage the execution of the instructions, and link the allocated internal and external memory resources to, respectively, the internal memory of the neural network processor and the selected external memory device. With such arrangements, the resources allocation (which includes the generation of instructions) can be performed ahead of the request, whereas the placement of the resources can be performed after the request, and the processing delay between receiving a request and generating an output for the request can be reduced. The system can become more responsive to the user's input, and both system performance and user experience can be improved.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a pre-determined function based on the prediction. For example, classifier device 100 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it and decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of pre-determined features data. The pre-determined features data may include data associated with a set of pre-determined visual image features such as, for example, a nose object, a mouth object, etc. The pre-determined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provide examples of techniques to allow allocation and placement of resources for deployment of prediction model 103 to be performed at different times and by different systems, which can expedite the operations of software application 102, as to be discussed below.

Figure 2A:
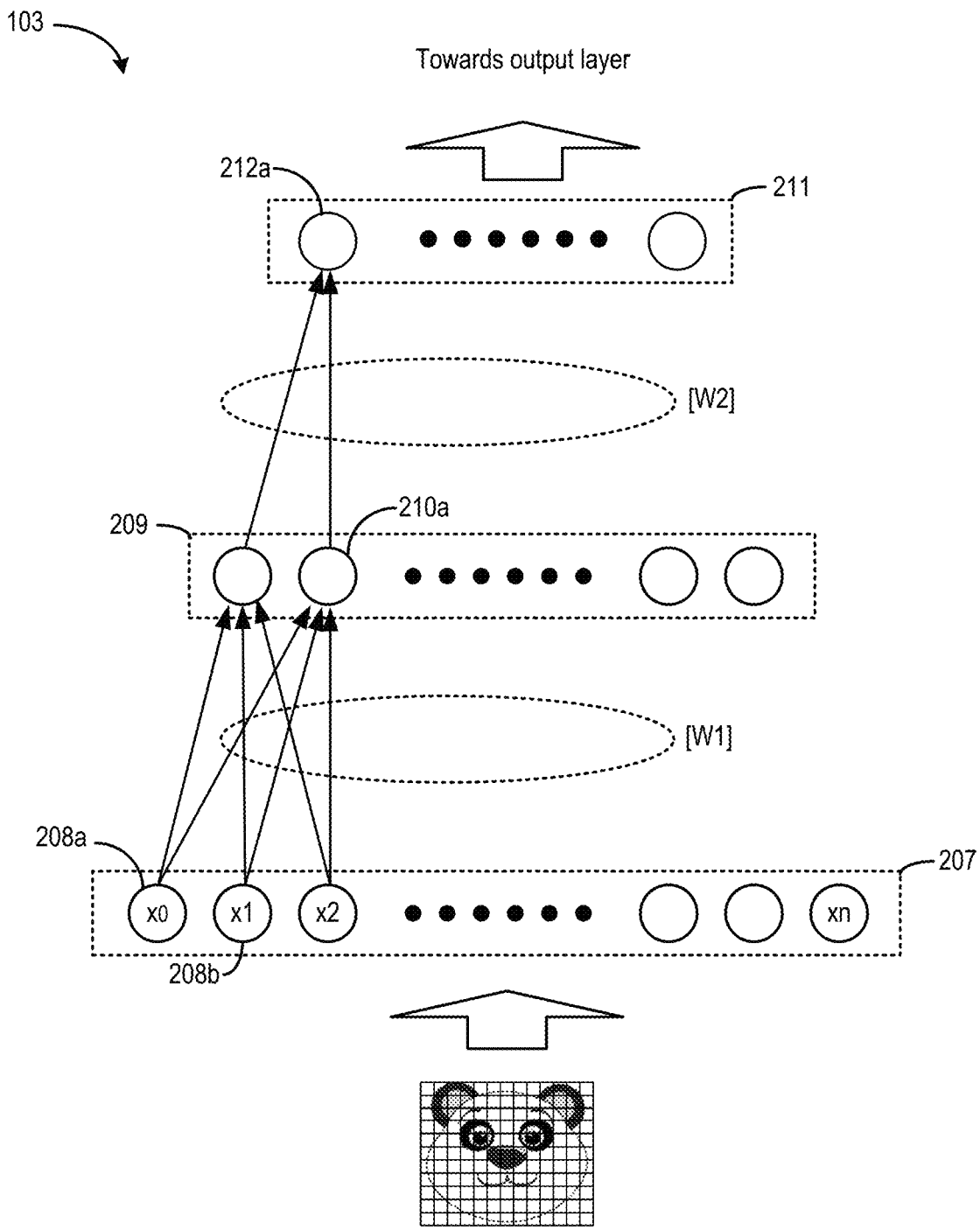
FIGS. 2A-2E are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet, etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, ... $x_n$) corresponding to a pre-determined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$sum_{210a} = \sum_{i=0}^{n}(W1_i \times x_i) \qquad \text{(Equation 1)}$$

Here, $sum_{210a}$ represents a sum generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $Sum_{210a}$) by summing the scaled pixel values. The sum may also represent a dot-product between an input vector comprising a number of elements (e.g., pixel values) and a weight vector (e.g., W1).

Figure 2B:
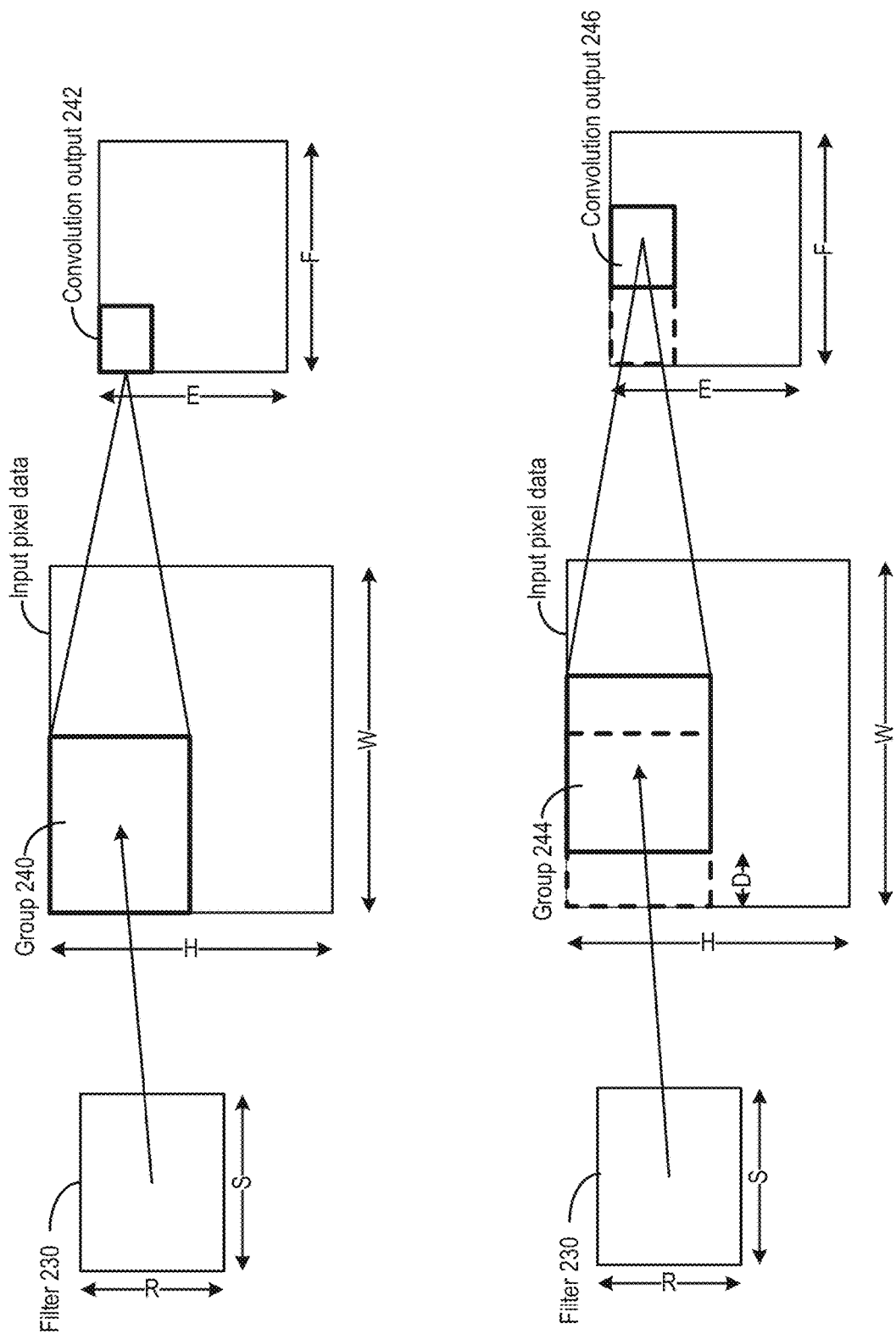

In a case where prediction model 103 is a CNN, each processing node of layer 209 may generate the sum based on the scaling of pixel values from a group of processing nodes of layers 207. The sum may represent a convolution result between a group of pixel values and a filter comprising the weight values. FIG. 2B illustrates an example of a convolution operation layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operations, such that the block of pixels corresponding to group 244 may be situated at a distance D (in terms of pixels) from the block of pixels corresponding to group 240, and the next block of pixels may also be situated at the same distance D from group 244. Other processing node of layer 209 may also receive groups of pixels corresponding to other rectangular blocks and generate other intermediate outputs. The convolution outputs can be part of a convolution output array 280 with a height of E rows and a width of F columns. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Figure 2C:
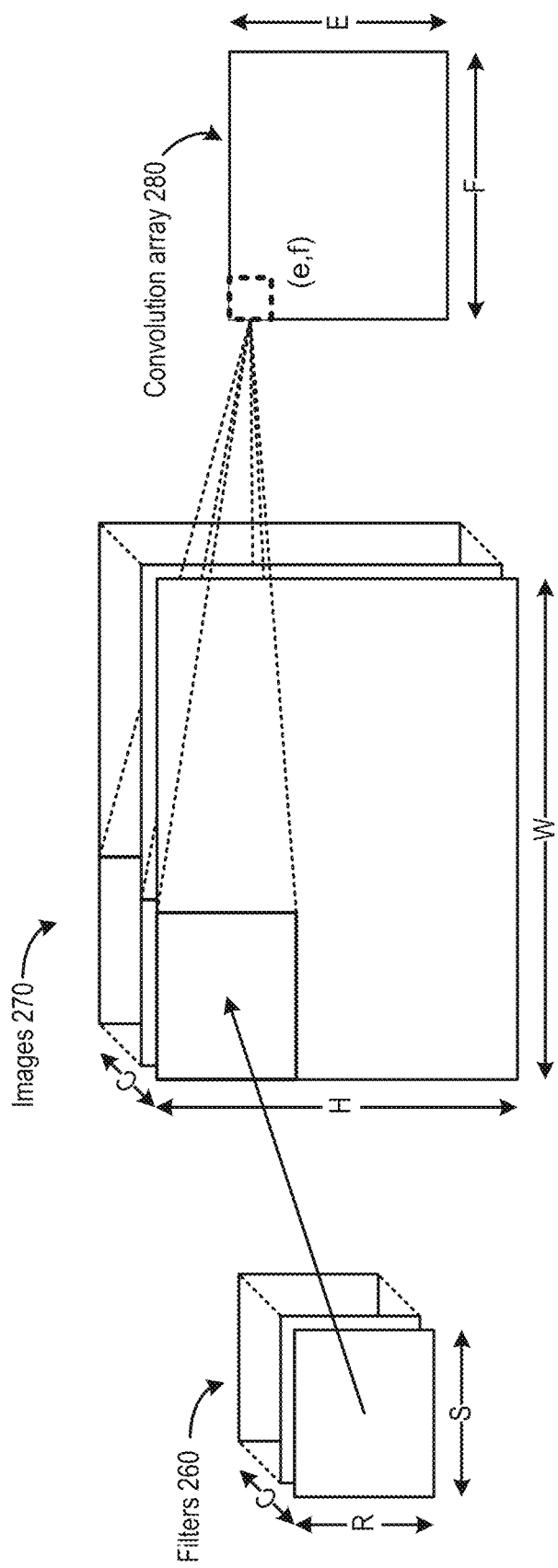

In some examples, the convolution operations can be performed between multiple images and multiple filters. For example, referring to FIG. 2C, a set of C filters 260 may corresponds to a number (C) of images 270, and convolution operations can be performed between each filter of the set of filters 260 and blocks of pixels on the corresponding image of images 270. The convolution results for each filter-image pair can be summed to generate a convolution output as follows:

$$O_{e,f} = \sum_{r=0}^{R-1}\sum_{s=0}^{S-1}\sum_{c=0}^{C-1} X^c_{eD+r,fD+s} \times W^c_{r,s} \qquad \text{(Equation 2)}$$

Here, the convolution operation involves the images (or pixel arrays). $X^c_{eD+r,fD+s}$ may refer to the value of a pixel at an image of index c, within the number (C) of images 270, with a horizontal pixel coordinate of eD+r and a vertical pixel coordinate of fD+s. D is the sliding-window stride distance, whereas e and f correspond to the location of the output in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O_{e,f}^m = \sum_{r=0}^{R-1}\sum_{s=0}^{S-1}\sum_{c=0}^{C-1} X_{eD+r,fD+s}^c \times W_{r,s}^{c,m} \quad \text{(Equation 3)}$$

Here, convolution output $O_{e,f}^m$ and weight $W_{r,s}^{c,m}$ has an index m corresponding to one of the M sets of filters.

Figure 2D:
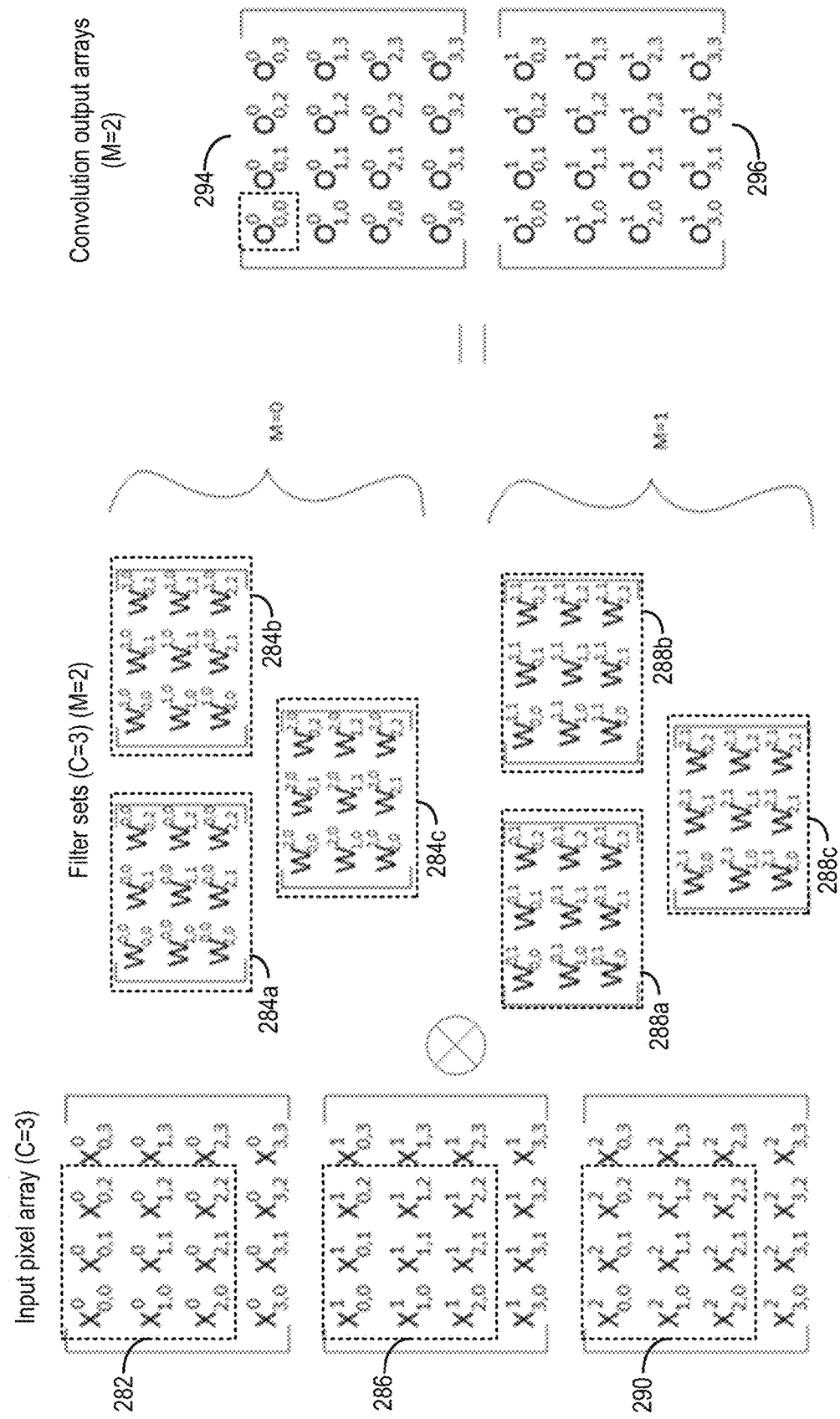

FIG. 2D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data sets, with each output data set corresponding to a convolution output array. Each convolution output array corresponds to convolving one set (of the M sets) of filters with the input pixel arrays. For example, $O_{0,0}^0$ can be generated by a sum of the dot-product between group of pixels 282 and filter array 284, the dot-product between group of pixels 286 and filter array 288, and the dot-product between group of pixels 290 and filter array 292.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLu) defined according to the following equation:

$$\text{ReLu}(y) = \max(0, y) \quad \text{(Equation 4)}$$

A processing node of layer 209 (e.g., processing node 210a) may process the sum with the ReLu function to generate a first intermediate output based on the following equation:

$$\text{first\_intermediate\_output}_{210a} = \text{ReLu}(\text{Sum}_{210a}) \quad \text{(Equation 5)}$$

In a case where prediction model 103 is a CNN, prediction model 103 may include a pooling layer (not shown in FIG. 2A) to reduce the size of the first intermediate outputs. For example, the pooling layer may perform a downsampling operation and forward a maximum intermediate output (generated based on the ReLu function) among a group of intermediate outputs (while discarding the rest of the intermediate outputs in the group) to layer 211.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 2E:
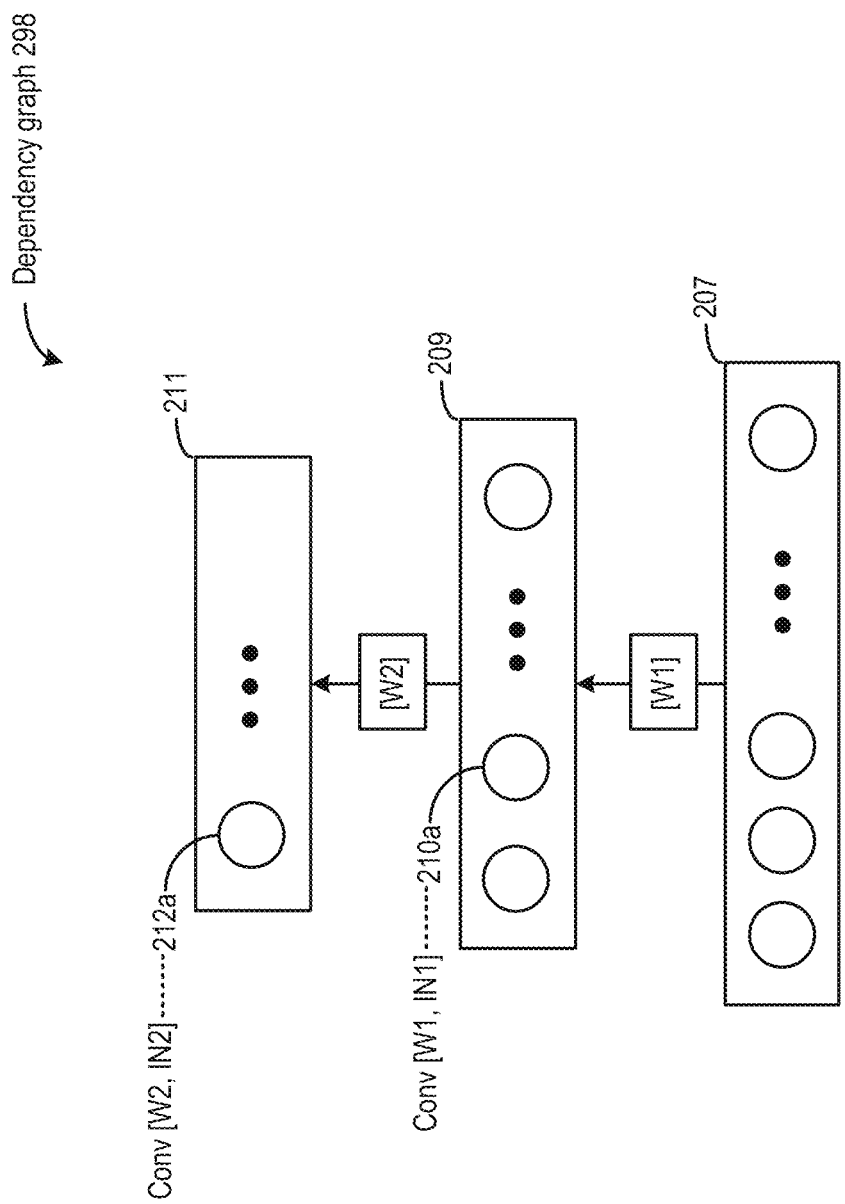

In some examples, neural network models (e.g., model 103 of FIG. 2A) can be represented by a dependency graph, whereas the operations at each neural network layer can be represented by one or more instructions. FIG. 2E illustrates an example of a dependency graph 298 that can represent model 103 of FIG. 2A. As shown in FIG. 2E, dependency graph 298 can be a linear graph which indicates that layer 209 has a data dependency on layer 207, with the intermediate value stored in each processing node of layer 209 determined based on computations (e.g., convolution operations, application of activation function, etc.) of the input values stored in the processing nodes of layer 207. Moreover, dependency graph 298 also indicates that layer 211 has a data dependency on layer 209, with the value (e.g., an output value) stored in each processing node of layer 211 determined based on results of computations (e.g., convolution operations, application of activation function, etc.) on the intermediate values stored in the processing nodes of layer 209. In addition, dependency graph 298 also indicates the values of weights involved in the computations. For example, dependency graph 298 may indicate that weight matrix W1 is used to scale the input values stored in the processing nodes of layer 207, and the scaled input values are provided to layer 209. Further, dependency graph 298 may also indicate that weight matrix W2 is used to scale the input values stored in the processing nodes of layer 209, and the scaled input values are provided to layer 211. The weight matrices can be obtained from an offline training process and stored as part of dependency graph 298.

Moreover, as part of the dependency graph, the processing nodes of some of the layers can be associated with a neural network operation. For example, processing node 210a can be associated with a convolution operation ("conv[W1, IN1]") between a weight matrix W1 and an input matrix IN1. The convolution operation can be similar to the operations described in FIG. 2D. Weight matrix W1 may be associated with processing node 210a, whereas input matrix IN1 may comprise the input values stored at some or all of processing nodes of layer 207. Moreover, processing node 212a can be associated with a convolution operation ("conv[W2, IN2]") between a weight matrix W2 and an input matrix IN2. The weight matrix W2 may be associated with processing node 212a, whereas input matrix IN2 may comprise the intermediate values stored at some or all of the processing nodes of layer 209.

Dependency graph may also include other information related to the input data to be processed. The information may include, for example, a size and a shape (e.g., a number of input data sets corresponding to the number C) of the input data, a type of the input data (e.g., whether the input data are floating number, the bit width of the input data, etc.), a source of the input data (e.g., whether the input data comes from an image file, an audio file, etc.). The data information may be generated during the offline training process and can be stored in metadata associated with the dependency graph.

Although FIG. 2E illustrates a linear graph, it is understood that dependency graph 298 can also have other topologies based on the topology of the neural network. For example, for a densenet, dependency graph 298 may include, for example, a directed acyclic graph. For LSTM, dependency graph 298 can also include, for example, a cyclic graph.

As to be discussed in more detail below, a neural network processor can be programmed to perform the neural network operations including, for example, the convolution operations described above. The neural network processor can be programmed to execute a sequence of instructions for each neural network operation. The sequence of instructions may also be specific for the architecture of the neural network processor. For example, the neural network processor may include internal memory to store input data (e.g., to be fed into the lowest level neural network layer), intermediate data (to be fed into the next level neural network layer), and output data (generated by the highest level neural network layer). The sequence of instructions may include a sequence of, for example, fetching of input data from an external memory, storing the input data at the internal memory, fetching of the input data to the computing resources, storing of the intermediate data and output data at the internal memory, and fetching of the output data from the internal memory to the external memory.

The neural network processor may also include, as part of computing resources, an array of processing elements. The processing elements can perform arithmetic operations described above to model the operations of a neural network. For example, each row of processing elements can be assigned to fetch one input data set (e.g., one input pixel array of C image pixel arrays of FIG. 2D) from a specific location of the internal memory. Moreover, the array of processing elements can be programmed to perform computations (e.g., the convolution operations, etc.) for each neural network layer sequentially based on the data dependency among the neural network layers. For example, based on dependency graph 298, the array of processing elements can be controlled to perform computations for neural network layer 207, followed by neural network layer 209 (e.g., conv[W1, IN1]), and then followed by neural network layer 211 (e.g., conv[W2, IN2]), etc. A sequence of instructions can then be provided to the array of processing elements to perform the computations for each neural network layer sequentially. The array of processing elements can receive an instruction, further break it down into a sequence of sub-operations for each processing element of the array to complete the execution of the instruction. For example, a processing element can be controlled to, based on the row and column the processing element is at, obtain a sequence of input data at different pre-determined times (e.g., $X_{0,0}^0$ at Time 0, $X_{0,1}^0$ at Time 1, etc.), and to perform additions and multiplications to generate a sequence of partial convolution sums, which can then be accumulated to generate a full convolution sum for an output data element (e.g., based on Equations 2 and 3 above).

A compiler can obtain information of a dependency graph representing a neural network model (e.g., dependency graph 298 of FIG. 2E) as well as neural network operations (e.g., convolution operations, multiplication operations, addition operations, etc.) associated with the neural network processing nodes/layers represented in the dependency graph. The compiler can extract the neural network operations from the dependency graph and determine a sequence of the neural network operations based on the dependency. For example, based on dependency graph 298, the compiler may determine that convolution operations ("conv[W2, IN2]") of processing layer 211 are to be performed after the convolution operations ("conv[W1, IN1]") of processing layer 209. Moreover, the convolution operations ("conv [W1, IN1]") of processing layer 209 are to be performed after, for example, processing layer 207 acquires input data.

Moreover, the compiler can also extract information about input data to be processed by the neural network from, for example, the metadata of dependency graph 298. For example, the compiler can determine a size and a shape (e.g., a number of input data sets corresponding to the number C) of the input data, a type of the input data (e.g., whether the input data are floating number, the bit width of the input data, etc.), a source of the input data, etc.

Moreover, the compiler can also obtain information about the architecture of a neural network processor to be used to perform the operations (e.g., convolution operations) associated with the neural network model, and determine a set of instructions for each of the operations as described above. For example, the compiler can determine a mapping between the storage locations of an internal memory (of the neural network processor) to different processing elements (also of the neural network processor), and decide where to store different data to be supplied to the different processing elements in the internal memory storages based on the mapping. The compiler can also determine a sequence of operations at different components of the neural network processor to complete the computations for each neural network layer. For example, the compiler can determine a sequence of instructions including instructions for fetching input data from an external memory to the internal memory, instructions for fetching the input data from the internal memory to the array of processing elements, instructions for performing computations at the array of processing elements, instructions for performing post-processing of the output of computations, instructions for writing the post-processing result back to the internal memory, and instructions for fetching the post-processing result from the internal memory back to external memory (e.g., to be consumed by software application 102), etc. The compiler may also generate multiple instruction files corresponding to neural network processing of different input data sets and/or based on different neural network models.

The compiler may also include information about the input data in the instruction file. For example, as described above, the compiler can determine a size and a shape (e.g., a number of input data sets corresponding to the number C) of the input data, a type of the input data (e.g., whether the input data are floating number, the bit width of the input data, etc.), a source of the input data, etc., and include these information in the instruction file. The compiler may also perform reformatting of the input data. For example, the compiler can convert the input data from one data type to another data type based on the neural network processor architecture.

Figure 3:
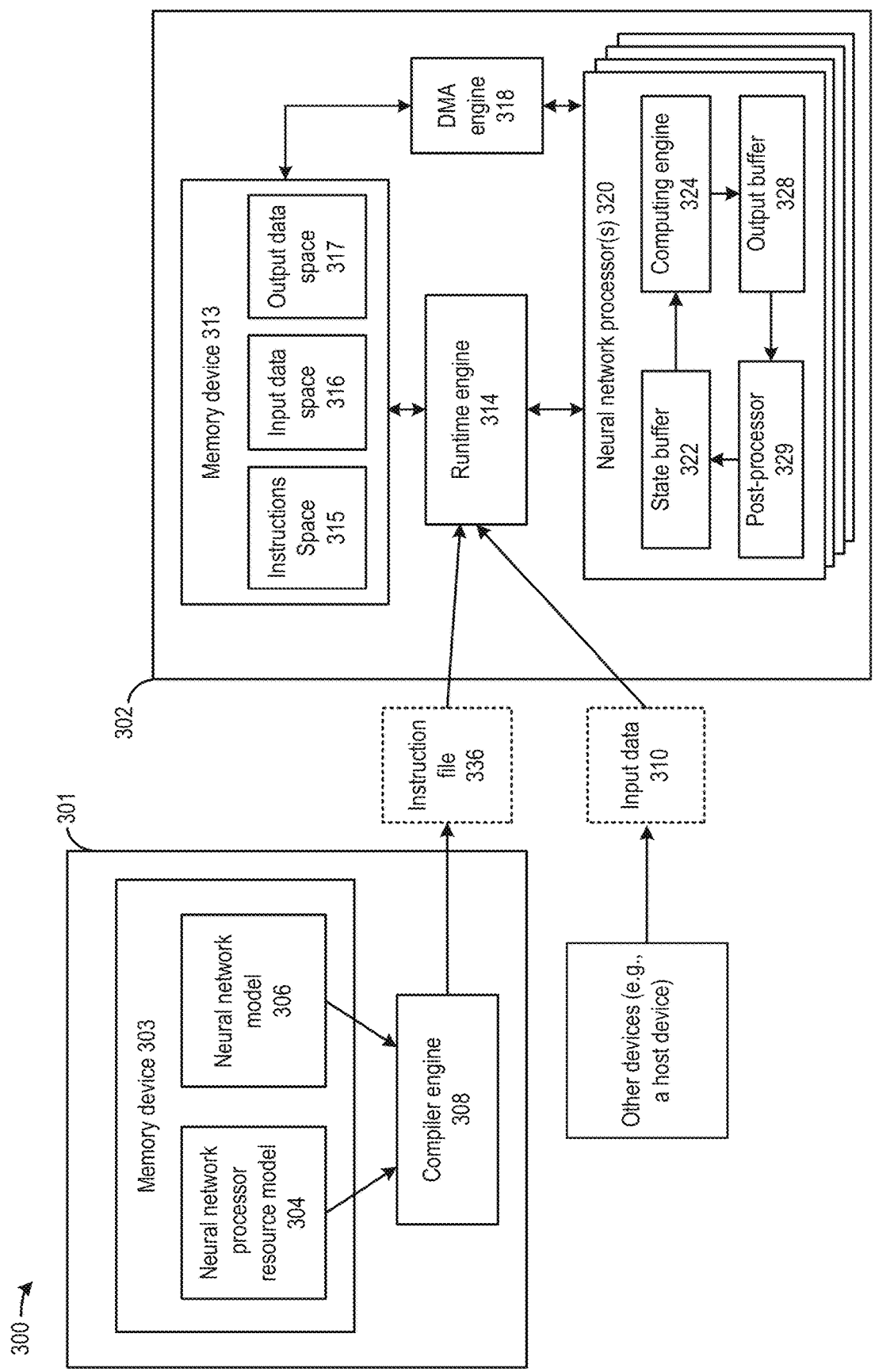
FIG. 3 illustrates simplified block diagrams for some of the components of an environment for implementing the prediction model of FIGS. 2A-2E, according to certain aspects of the present disclosure.

FIG. 3 shows an environment 300 according to some embodiments of the present disclosure. Environment 300 may include multiple computing systems including a computer system 301 and a computer system 302 connected together via one or more networks (not shown in FIG. 3). Environment 300 may be part of a multi-tenant compute service system to provide computing and memory resources for a computing service. For example, referring back to FIG. 1, environment 300 may provide computing and memory resources for computations with prediction model 103. A host device, which can be part of or separate from environment 300, can operate software application 102 and use the computing and memory resources provided by environment 300 to perform one or more image recognition tasks based on computations with prediction model 103.

In the example of FIG. 3, computer system 301 may include a memory device 303. Memory device 303 may include any suitable memory, e.g., dynamic random access memory (DRAM), synchronous DRAM (SDRAM), double data rate DRAM (DDR DRAM), storage class memory (SCM), flash memory devices, etc. Memory device 303 can store a neural network processor resource model 304 and a neural network model 306. Neural network processor resource model 304 may include architecture information of a neural network processor. The architecture information may indicate, for example, a mapping between the storage locations of an internal memory of a neural network processor to different processing elements, the functionalities and connectivity between different components of the neural network processor, etc. Neural network model 306 can be in a form of a dependency graph (e.g., dependency graph 298) that includes a sequence of neural network operations.

Computer system 301 further includes a compiler engine 308, which can be software instructions stored in memory device 303 and executed by a hardware processor of computer system 301 (not shown in FIG. 3). Compiler engine 308 may determine the memory and computation resources to be allocated based on neural network processor resource model 304 and neural network model 306. Compiler engine 308 can determine a sequence of neural network operations from neural network model 306 based on, for example, the neural network operations associated with each neural network layer of the model, as well as the data dependency between the neural network layers. Compiler engine 308 can also generate a sequence of instructions to map the sequence of neural network operations to the resources available at a neural network processor based on neural network processor architecture model 307.

Computer system 302 may be a computer system to interface with a host device (not shown in FIG. 3). Computer system 302 may receive input data 310 (e.g., image 104 from the host device) to provide neural network processing on the input data 310. Computer system 302 may include a memory device 313, a runtime engine 314, a DMA engine 318, and one or more network processors 320. As to be discussed in more details below, runtime engine 314 can perform placement of the memory and computation resources allocated by compiler engine 308 by, for example, coordinating the operations at memory device 313 and neural network processor(s) 320. Runtime engine 314 can be software instructions stored in memory device 313 (or other memory devices) and executed by a hardware processor of computer system 302 (not shown in FIG. 3). Runtime engine 314 can also be part of an integrated circuit comprising neural network processor(s) 320.

Although FIG. 3 illustrates that compiler engine 308 and runtime engine 314 reside in different systems, it is understood that compiler 308 and runtime engine 314 can reside in the same system. Further, in some examples, memory device 303 and memory device 313 can also be part of a single memory device, or memory devices of a single computer system. Computer systems 301 and 302 can also be part of a single computer system.

Memory device 313 may provide a staging area to support the neural network processing using neural network model 306 on input data 310. The staging area may include an instruction space 315, an input data space 316, and an output data space 317. Instruction space 315 can be used to store a set of instructions to be executed by a neural network processor (e.g., network processors 320, or other network processors) for the neural network processing. Input data space 316 can be used to store input data 310 and the weights, whereas output data space 317 can be used to store output data generated by the neural network processor. Memory device 313 may include any suitable memory, e.g., dynamic random access memory (DRAM), synchronous DRAM (SDRAM), double data rate DRAM (DDR DRAM), storage class memory (SCM), flash memory devices, etc.

Neural network processors 320 can provide the resources to process input data 310 with neural network model 306. Each of neural network processors 320 may include a state buffer 322, a computing engine 324, an output buffer 328, and a post-processor 329. State buffer 322 may provide internal memory to store input data, intermediate data, and output data to support computations at computing engine 324. Neural network processors 320 can access memory device 313 via DMA engine 318. In some examples, neural network processors 320 can be part of an integrated circuit (e.g., a system-on-chip (SoC)) that is electrically connected with memory device 313 and runtime engine 314 with high speed interconnects of, for example, Peripheral Component Interconnect (PCI) based protocols. In some examples, DMA engine 318 may be part of the SoC that includes neural network processors 320 as well. In some examples, DMA engine 318 and neural network processors 320 can be implemented on different integrated circuits. As described above, neural network processors 320 and runtime engine 314 can be part of an integrated circuit, or can be in different integrated circuits and/or in different computing systems.

Computing engine 324 may include an array of processing elements to perform arithmetic operations for a neural network operation (e.g., a convolution operation) as described above. State buffer 322 may be configured to provide caching of data used for computations at computing engine 324. The data cached at state buffer 322 may include, for example, input data and weights obtained from memory device 313, as well as intermediate outputs of computations at computing engine 324. The caching can reduce the effect of memory access bottleneck on the performance of computing engine 324. State buffer 322 can be an on-chip memory device and may include, for example, static random access memory (SRAM). State buffer 322 may include rows of storage elements, with a row of storage elements configured to store input data and output data generated by a corresponding row of processing elements of computing engine 324. In addition, output buffer 328 may include a set of registers to store the outputs of computing engine 324. Output buffer 328 also enables additional processing such as, for example, accumulation of partial sums from each column of computing engine 324 to generate an output data element. Moreover, post-processor 329 can be configured to apply one or more activation functions (e.g., ReLu function) and/or other types of post-processing (e.g., pooling) on the output of output buffer 328, and store the results of the post-processing at state buffer 322.

As discussed above, compiler engine 308 may receive neural network processor resource model 304 and neural network model 306, and determine the memory and computation resources to be allocated based on the models. Neural network processor architecture model 304 may include architecture information of neural network processor 320 including, for example, a mapping between each row of processing elements and locations of state buffer 322 from which the row can obtain input data and store intermediate data, a location of the state buffer configured to store output data, etc. Neural network processor architecture resource model 304 may also include information related to the functionalities of state buffer 322, computing engine 324, output buffer 328, and post-processor 329.

Based on the information from neural network processor resource model 304 and neural network model 306, compiler engine 308 can perform allocation of memory resources to support the neural network processing using neural network model 306. For example, based on the shape and size of the input data for neural network model 306, compiler engine 308 can determine the size of external memory needed to store the input data and the weights (before the input data are to be fetched to the allocated computation resources), the size of external memory needed to store the intermediate data and output data, the sequence of access to the external memory, etc. Compiler engine 308 can generate a set of memory references (e.g., in the form of DMA descriptors) to represent the allocated memory resources for the input data, the weight, the intermediate data, and the output data. As to be discussed in more details below, the set of memory references are generic and applicable to any memory device, and runtime engine 314 will perform memory resource placement by selecting a physical memory device (e.g., memory device 313, or other memory devices), allocating memory spaces for input data and output data in the selected physical memory device based on information provided by compiler engine 308, storing the input data at the allocated memory spaces, and linking the allocated memory spaces with the set of memory references.

Moreover, compiler engine 308 can also perform allocation computation resources based on the information from neural network processor resource model 304 and neural network model 306. For example, compiler engine 308 can determine a sequence of instructions to perform neural network processing for each neural network layer in neural network model 306, and the sequence of instructions can be determined while accounting for the data dependency between the neural network layers in the model. For example, compiler engine 308 can determine a first sequence of instructions for neural network layer 207, followed by a second sequence of instructions for neural network layer 209, followed by a third sequence of instructions for neural network layer 211, etc.

Further, for each neural network layer, compiler engine 308 can also generate a sequence of instructions directed to different components of a neural network processor (e.g., one of neural network processors 320) based on neural network processor resource model 304. The sequence of instructions are generic for any neural network processor having the same components and functionalities as indicated in neural network processor resource model 304. For example, assuming that neural network processor resource model 304 includes architecture information of neural network processors 320, compiler engine 308 can determine a sequence of instructions including instructions to control state buffer 322 to fetch input data and the weights from an allocated memory space of an external memory (e.g., input data space 316), and to place the input data and weights at pre-determined locations within state buffer 322 based on the mapping between each row of processing elements and the locations within state buffer 322. The sequence of instructions can also include instructions to control each row of processing elements in computing engine 324 to pre-fetch the weights and input data from the pre-determined locations. The sequence of instructions can also include instructions to computing engine 324 to perform certain computations to support the neural network operations for a neural network layer based on neural network model 306, instructions to output buffer 328 to perform the additional processing (e.g., accumulation of partial sums from each column of computing engine 324 to generate an output data element), and instructions to post-processor 329 to apply one or more activation functions (e.g., ReLu function) and/or other types of post-processing (e.g., pooling) on the output of output buffer 328 and to store the result of the post-processing back to pre-determined locations within state buffer 322. The set of instructions may also include instructions to control state buffer 322 to write back the result of the post-processing to an allocated memory space in the external memory (e.g., output data space 317). The instructions that refer to allocated memory space in the external memory can be in the form of generic memory references such as a DMA descriptors, as described above. Compiler engine 308 can also extract the weight data from neural network model 306.

Compiler engine 308 can provide the information about the allocated memory resources (e.g., memory references) and the allocated computation resources (e.g., in the form of sequence of instructions to a neural network processor) to runtime engine 314, which can then perform placement of the allocated memory resources and the allocated computation resources. In some examples, compiler engine 308 and runtime engine 314 are of different systems, and may operate at different times. For example, as to be described in more details below, compiler engine 308 may perform pre-compilation of neural network model 306 and perform allocation of memory and computation resources for neural network processing well before a host device sends a request for the neural network processing, whereas runtime engine 314 may perform resource placement after receiving the request from the host device. Compiler engine 308 can store information indicating the allocated memory and computation resources at a time when runtime engine 314 is not performing the resources placement. When the time comes for runtime engine 314 to perform resources placement (e.g., after receiving a request from the host device), runtime engine 314 can retrieve the stored information to determine the allocated memory and computation resources, and perform resource placement accordingly.

Figure 4A:
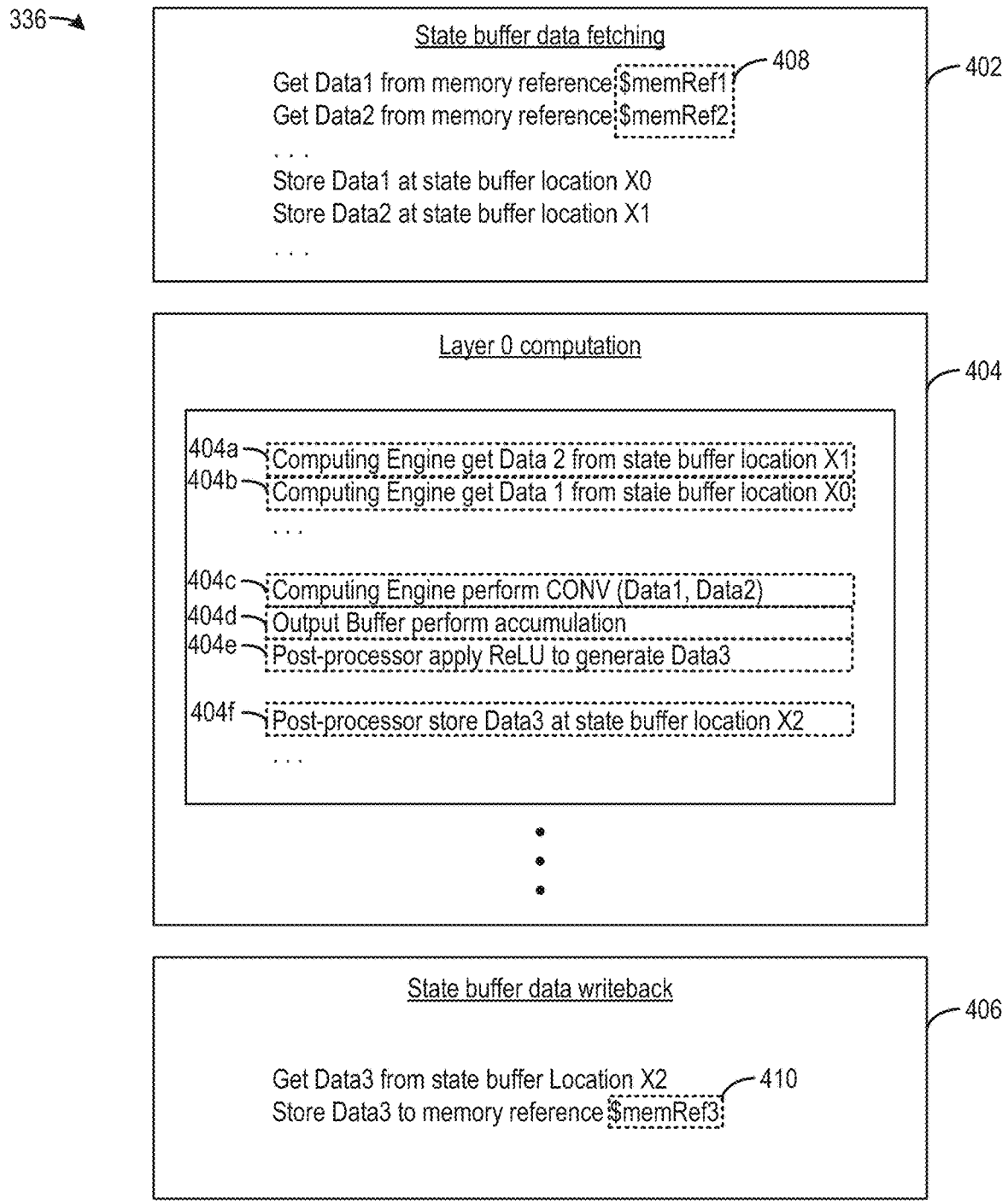
FIGS. 4A-4C are simplified block diagrams illustrating resources management and placement for the environment of FIG. 3, according to certain aspects of the present disclosure.

In some examples, compiler engine 308 can also generate an instruction file 336 which includes the sequence of instructions and other information related to allocated resources, and provide instruction file 336 to runtime engine 314 to perform resource placement. FIG. 4A illustrates an example of instruction file 336. As shown in FIG. 4A, instruction file 336 may include a first instructions sequence 402, a second instructions sequence 404, and a third instructions sequence 406. First instructions sequence 402 can include a set of instructions to control state buffer 322 to fetch input data and weights (denoted as "Data1" and "Data2" in FIG. 3D) from certain locations of an external memory (e.g., memory device 313, or other memory devices), and to store the input data and weights at certain locations of state buffer 322 (denoted with "X0" and "X1" in FIG. 4A). Third instructions sequence 406 can also include a set of instructions to fetch output data (e.g., "Data3" in FIG. 4A) from certain locations of state buffer 322 (denoted with "X2" in FIG. 4A) and write back the output data to certain locations of the external memory. The locations of external memory are represented as memory references 408 and 410, which can refer to different locations of a memory (such that different data are stored at different locations and not overwriting each other) without being specific about the actual physical addresses of these locations. Such arrangements allow flexibility in placement of physical memory resources for the storage of input data and weights. For example, as to be described below, runtime engine 314 can select a memory device (e.g., due to its available space) to store the input data and weight, and link memory references 408 (which can be DMA descriptors) to the physical addresses of the memory device. Runtime engine 314 can then perform memory accesses to the selected memory device based on first instructions sequence 402 and third instructions sequence 406.

In addition, second instructions sequence 404 may include instructions for each component of a neural network processor to perform a neural network operation. For example, second instructions sequence 404 may include a set of instructions for PE 11 and other PEs for layer 0 computation. The set of instructions may include an instruction 404a to a computing engine (e.g., computing engine 324) fetch weight data (e.g., "Data2") from state buffer 322, an instruction 404b to the computing engine to fetch input data (e.g., "Data 1") from state buffer 322, an instruction 404c to the computing engine to perform a convolution operation between the input data and the weight data, an instruction 404d to an output buffer (e.g., output buffer 328) to accumulate the outputs from the computing engine, an instruction 404e to a post-processor (e.g., post-processor 329) to apply an activation function (e.g., ReLU) to the output of output buffer to generate an output (e.g., "Data3"), followed by an instruction 404f to the post-processor to store the output at a pre-determined location of the state buffer (e.g., "X2"). Each instruction of second instructions sequence 404 can be provided by runtime engine 314 to a selected neural network processor (e.g., one of neural network processors 320) sequentially based on an order by which the instructions are listed in instruction file 336.

Further, compiler engine 308 may include information about the input data in instruction file 336. The information may include, for example, the type of data to be processed, the size and shape of the data, the expected source of data, etc.

Referring back to FIG. 3, runtime engine 314 may perform resource placement based on instruction file 336 received from compiler engine 332. The resource placement can be performed when, for example, runtime engine 314 receives a request from the host device to perform neural network processing on the input data included in instruction file 336. Runtime engine 314 can perform placement of computation and memory resources.

In some examples, for placement of memory resources, runtime engine 334 may determine a set of physical memory devices available/accessible to runtime engine 334, and can select one or more of the physical memory devices to support the neural network processing based on pre-determined criteria. For example, runtime engine 334 can select a memory device with available capacity that exceeds the capacity required for the neural network processing, which runtime engine 334 can determine from instruction file 336 (e.g., based on a number of PEs involved in the processing). Runtime engine 334 can also select a memory device based on, for example, a throughput of data transfer to and from the memory device. In some examples, runtime engine 334 may also select multiple memory devices and/or switch between different memory devices to support the neural network processing.

After selecting one or more memory devices, runtime engine 334 can allocate one or more memory spaces on the selected one or more memory devices, and create a staging area in the allocated memory spaces to store the set of instructions to be executed for the neural network processing operations, the input data to be processed by the neural network processing operations, and output data to be generated by the neural network processing operations. For example, as shown in FIG. 3, runtime engine 334 may select memory device 313 to support the neural network processing operations associated with instruction file 336. Runtime engine 314 may allocate a memory space in memory device 313 to create a staging area comprising, for example, instructions space 315, input data space 316, and output data space 317. Runtime engine 314 may extract instructions (e.g., first instructions sequence 402, second instructions sequence 404, third instructions sequence 406, etc.) from instruction file 336 and store the instructions in instruction space 315. Runtime engine 314 may receive input data 310 (e.g., from a host device) and weights data 311 (e.g., from the host device, or from other sources), and store input data 310 and weights data 311 in input data space 316. Runtime engine 314 further output data space 317 for output data.

Runtime engine 314 may also perform additional processing of the input data based on information extracted from instruction file 336. For example, runtime engine 314 may obtain type of input data information (e.g., whether the input data is floating point type), the source of input data information (e.g., whether the input data comes from an image file or from an audio file), etc., and perform additional processing of the input data based on the information. For example, runtime engine 314 may compare a type of the input data 310 versus the type of input data specified in the instruction file. If the types do not match, runtime engine 314 may either stop the neural network processing, or perform conversion of the data. Runtime engine 314 may also determine whether the source of the input data matches with the source specified in the instruction file, and may reject the input data (and stop the neural network processing) if the sources do not match.

Figure 4B:
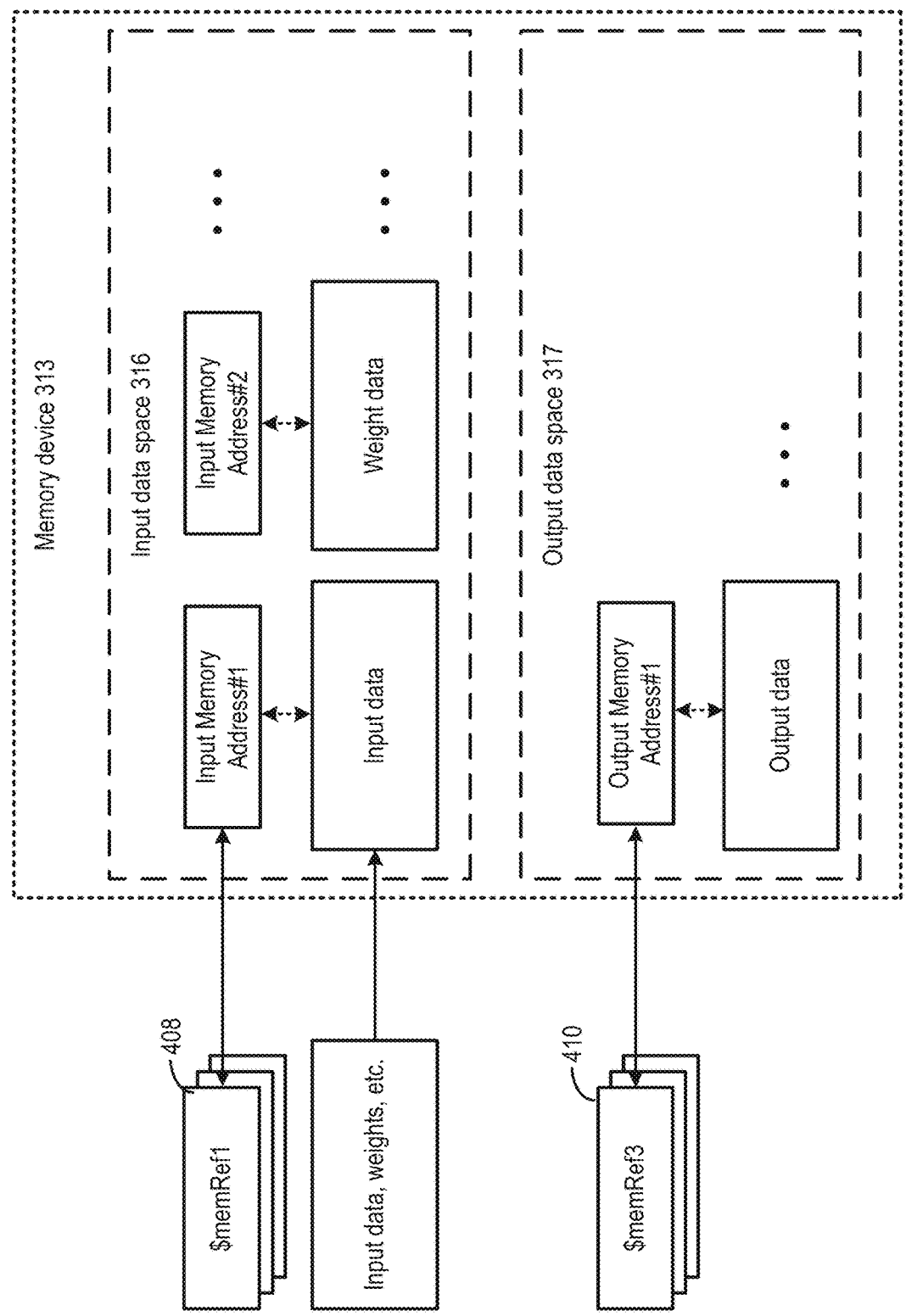

As part of the memory resources placement, runtime engine 314 can also provide a linkage between the memory references included in instruction file 336 and the memory addresses of staging area, which allows runtime engine 314 (and/or other components of a neural network processor) to access the staging area for the neural network operations. FIG. 4B provides an example of the linkage. As shown in FIG. 4B, memory references 408, which are allocated by compiler engine 308 to store input data and weight elements, are linked or mapped to different input memory addresses of input data space 316. Moreover, memory references 410, which are allocated by compiler engine 332 to store output data elements generated by the neural network processor, are linked or mapped to different output memory addresses of output data space 317. In some examples, the memory references can be in the form of DMA descriptors. Runtime engine 314 can determine the mapping relationships between the DMA descriptors and the physical addresses (e.g., input memory addresses of input data space 316, output memory addresses of output data space 317, etc.), and provide the mapping relationships to DMA engine 318. When executing the instructions from instructions space 315, a neural network processor can provide the memory references included in the instructions to the DMA engine to access the staging area to, for example, fetch input data and weights, store output data, etc.

In addition to memory resources, runtime engine 314 can also perform placement of computation resources to support the neural network processing operation requested by the host device. As part of the placement of computation resources, runtime engine 314 may search for one or more neural network processors (including neural network processors 320) to execute the instructions based on pre-determined criteria. The criteria may include, for example, whether the architecture of the neural network processor matches neural network processor resource model 304 (based on which compiler engine 308 generates the instructions), the availability of the neural network processor, the priority of the request, an expected execution time of the neural network processing operation, etc. Referring back to FIG. 3, runtime engine 314 may select one or more of neural network processors 320 to execute the instructions in instruction file 336. Further, runtime engine 314 can also receive additional information about the input data (e.g., the type of input data, whether the input data are floating point data, etc.), and configure the selected neural network processor(s) to process and handle the input data accordingly.

Figure 4C:
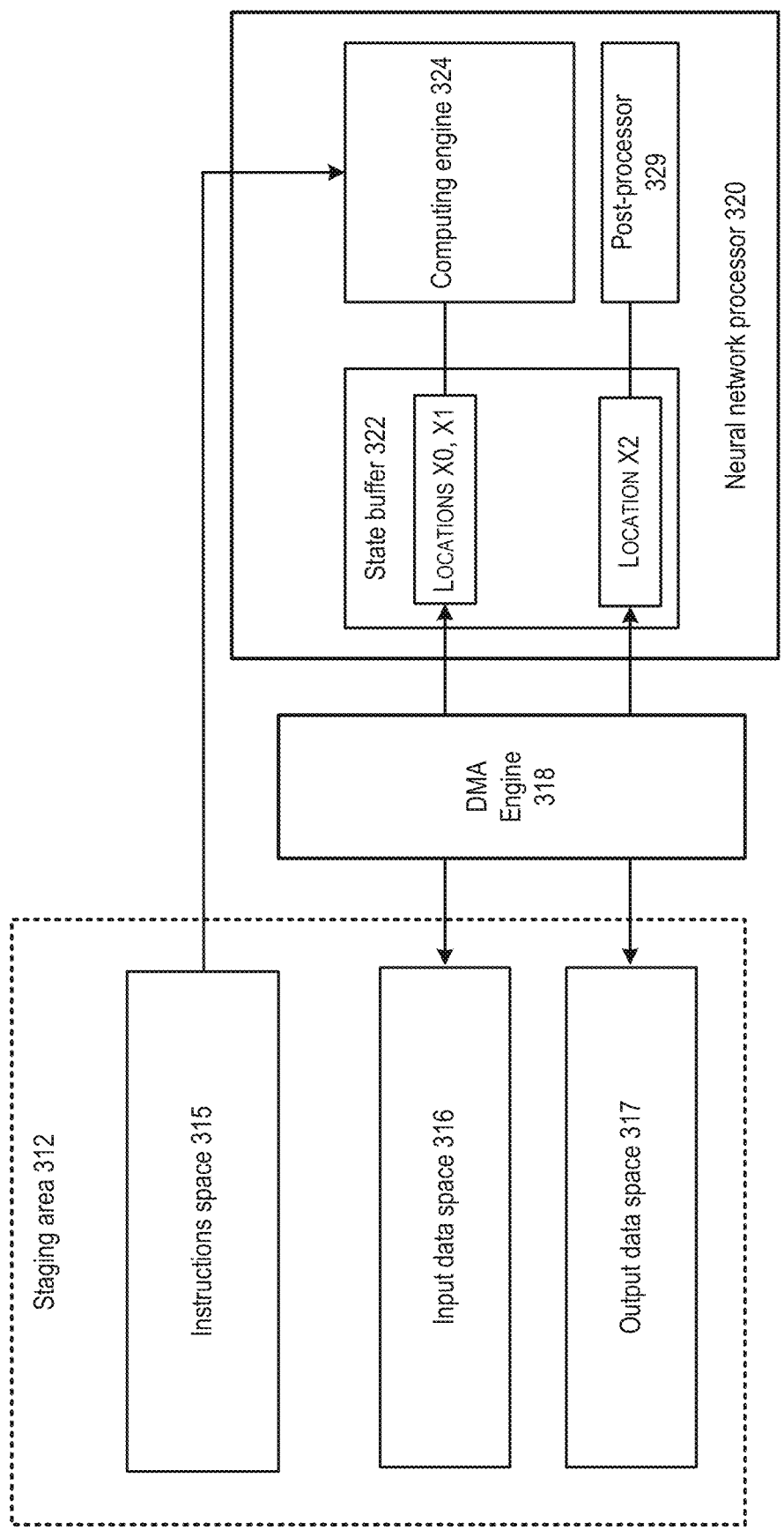

FIG. 4C illustrates an example of operations by runtime engine 314 to perform a neural network processing operation requested by a host device. Runtime engine 314 may provide a set of mappings between the memory references included in the instructions, and physical memory addresses of input data space 316 and output data space 317 to DMA engine 318. Runtime engine 314 can also fetch the instructions to different components of neural network processors 306. For example, runtime engine 314 can fetch second instructions sequence 404 to state buffer 322, to control state buffer 322 to fetch input data and weight elements from input data space 370. State buffer 322 can provide the memory references included in first instructions sequence 402 to DMA engine 318 to access input data space 316 for the input data and weight elements. After state buffer 322 fetches and stores the input data and weight elements, runtime engine 314 can fetch second instructions sequence 404 to computing engine 324 to control the processing elements to fetch the input data and weight elements from pre-determined locations of state buffer 322 (e.g., locations X0, X1, etc.), and to perform the operations for the neural network processing operation. Second instructions sequence 404 can also control post-processor 329 to store the output data at pre-determined locations of state buffer 322 (e.g., locations X2). After the output data have been stored at state buffer 322, runtime engine 314 can fetch third instructions sequence 406 to control state buffer 322 to store the output data at output data space 317. State buffer 322 can provide the memory references included and fetch third instructions sequence 406 to DMA engine 318 to access output data space 317 to store the output data elements.

In some examples, runtime engine 314 can update the placement of computation resources before the completion of a neural network processing operation. For example, runtime engine 314 may suspend the performance of a first neural network processing operation for a first request at one of neural network processors 320, and use it to perform a second neural network processing operation for a second request from the host device (or from other devices). The second neural network processing operation may be based on a different neural network model. The suspension can be based on, for example, the priority of the second request over the first request, the expected execution time of the remaining first neural network processing operation being much longer than the expected execution time of the second neural network processing operation, etc. In some examples, after the second neural network operation completes, runtime engine 334 may resume the first second neural network operation at one of neural network processors 306. In some examples, runtime engine 334 may also select a different neural network processor (e.g., another one of neural network processors 306) to resume the first neural network operation.

Figure 5:
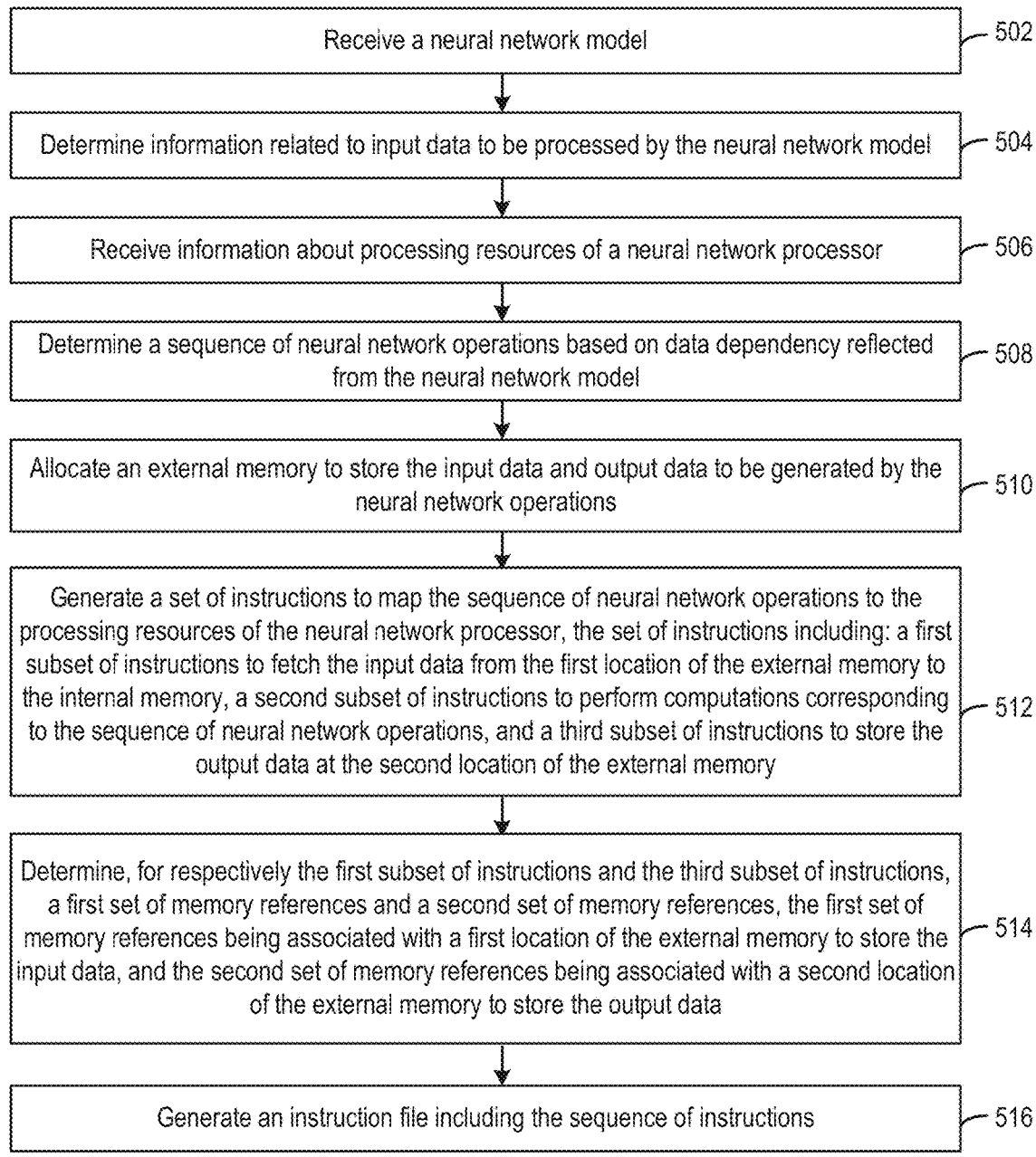
FIG. 5 illustrates an example flow diagram of performing neural network processing, according to certain aspects of the present disclosure.

FIG. 5 illustrates an example flow diagram of a process 500 for operating an array of processing elements. Process 500 may be implemented by, for example, compiler engine 308 of FIG. 3.

At operation 502, compiler engine 308 may receive a neural network model. Compiler engine 308 may receive the neural network model from a memory device (e.g., memory device 303). The neural network model may include multiple neural network layers. The neural network model may be in the form of a dependency graph that indicates the data dependency between the neural network layers and the neural network operations associated with each neural network layer. The neural network model may also include the set of weights to be applied to the computation of output data for each neural network layer. The neural network model may also include metadata related to the input data to be processed. The metadata may include, for example, a shape and a size of the input data, a type of the input data (e.g., whether the input data are floating-point type, the bit width of the input data), an expected source of the input data (e.g., whether the input data are to come from an image file, an audio file, etc.). All these information can be generated from an offline training process.

At operation 504, compiler engine 308 may determine information related to the input data to be processed by the neural network model. The information may include, the set of weights to be applied, a shape and a size of the input data, a type of the input data, an expected source of the input data, etc. The information may be extracted from, for example, the weights and the metadata included in the neural network model.

At operation 506, compiler engine 308 may receive information about processing resources at a neural network processor. Compiler engine 308 may receive the information from a memory device (e.g., memory device 303). The neural network processor may include internal memory (e.g., a state buffer), an array of processing elements, etc. The information may include architecture information of the neural network processor and can include, for example, a number of rows and columns of the array of the processing elements, the mapping between each row of processing elements and a location of the internal memory from which the row can obtain input data and store intermediate data, a location of the internal memory configured to store output data, etc.

At operation 508, compiler engine 308 may determine a sequence of neural network operations based on data dependency reflected from the neural network model. The neural network operations can be associated with a number of neural network layers and are to be performed by the neural network processor based on the sequence.

At operation 510, compiler engine 308 may allocate an external memory to store the input data and output data to be generated by the neural network operations. For example, based on the sequence of neural network operations, compiler engine 308 can determine a set of memory access operations to support the sequence of neural network operations including, for example, memory read operations to obtain input data from an external memory, memory write operations to store output data to the external memory, etc. Compiler engine 308 can allocate the external memory based on, for example, a size of the input data to be acquired from the external memory, a size of the output data to be stored into the external memory, etc.

At operation 512, compiler engine 308 may generate a set of instructions to map the sequence of neural network operations to the processing resources of the neural network processor. The set of instructions may be determined based on the sequence of neural network operations determined at operation 508. The set of instructions may include a first subset of instructions to fetch the input data from the first location of the external memory to the internal memory. The set of instructions may also include a second subset of instructions to perform computations corresponding to the neural network operations at the array of the processing elements. The set of instructions may further include a third subset of instructions to store the output data at the second location of the external memory.

At operation 514, compiler engine 308 may determine a first set of memory references associated with a first location of the external memory to store the input data and a second set of memory references associated with a second location of the external memory to store the output data. The memory references may be determined for the first subset of instructions and for the third subset of instructions and can be determined based on, for example, a size of input data to be fetched by each of the first subset of instructions, a size of output data to be stored by each of the third subset of instructions, etc. Compiler engine 308 may also associate the first set of memory references with the first subset of instructions, and associate the second set of memory references with the third subset of instructions.

At operation 516, compiler engine 308 may generate an instruction file including the sequence of instructions and the input data. The instruction file can be provided to a runtime engine (e.g., runtime engine 314) to perform resources placement.

Figure 6A:
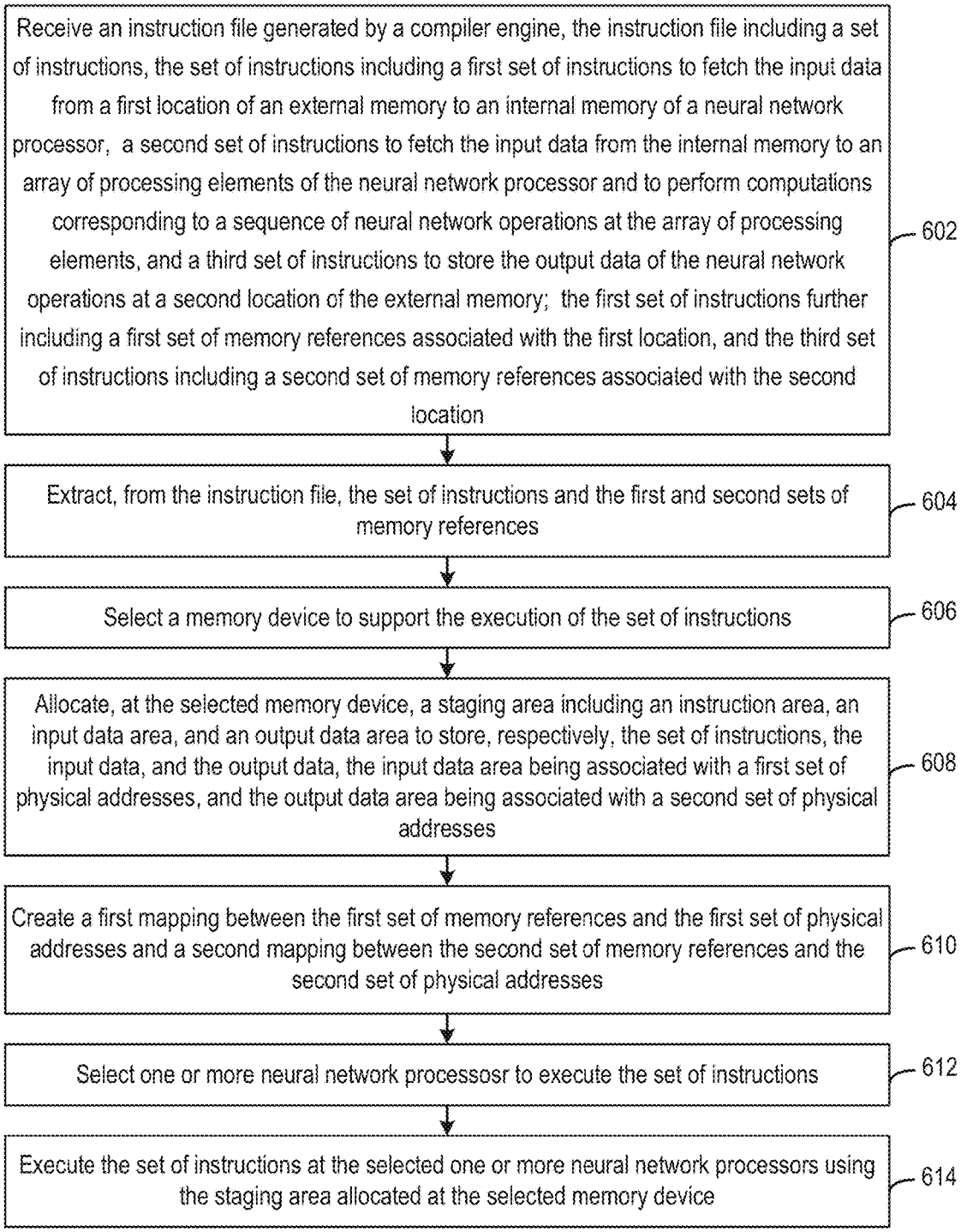
FIGS. 6A and 6B illustrate another example flow diagram of performing neural network processing, according to certain aspects of the present disclosure.
Figure 6B:
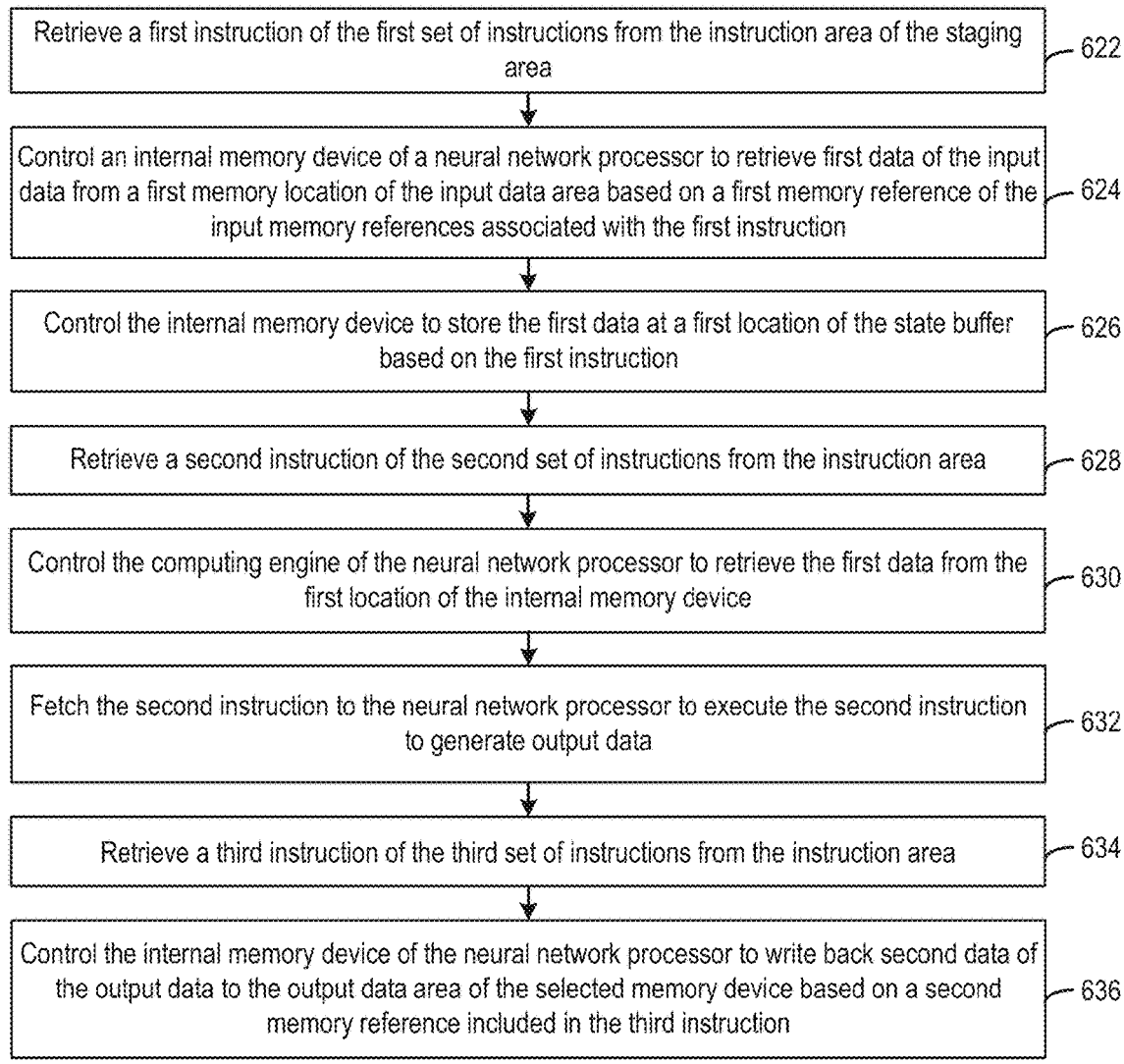

FIGS. 6A and 6B illustrate an example flow diagram of a process 600 for operating an array of processing elements. Process 600 may be implemented by, for example, runtime engine 314 of FIG. 3.

At operation 602, runtime engine 334 may receive an instruction file generated by a compiler engine (e.g., compiler engine 332), the instruction file including a set of instructions. The instruction file could be one generated by the method 500 and/or depicted in FIG. 4A. The set of instructions may include a first subset of instructions to fetch the input data from a first location of an external memory to an internal memory of a neural network processor. The set of instructions may also include a second subset of instructions to fetch the input data from the internal memory to an array of processing elements of the neural network processor and to perform computations corresponding to a sequence of neural network operations at the array of processing elements. The set of instructions may further include a third subset of instructions to store the output data of the neural network operations at a second location of the external memory. The first subset of instructions include a first set of memory references associated with the first location, whereas the third subset of instructions include a second set of memory references associated with the second location.

At operation 604, runtime engine 334 may extract, from the instruction file, the set of instructions, the input data, the weights, and the first and second sets of memory references.

At operation 606, runtime engine 334 may select a memory device to support the execution of the set of instructions. In some examples, runtime engine 334 may determine a set of physical memory devices available/accessible to runtime engine 334, and can select one or more of the physical memory devices to support the neural network processing based on pre-determined criteria. For example, runtime engine 334 can select a memory device with available capacity that exceeds the capacity required for the neural network processing, which runtime engine 314 can determine from the instruction file received in operation 604. Runtime engine 314 can also select a memory device based on, for example, a throughput of data transfer to and from the memory device. In some examples, runtime engine 314 may also select multiple memory devices and/or switch between different memory devices to support the neural network processing.

At operation 608, runtime engine 314 may assign, at the selected memory device, a staging area including an instruction area, an input data area, and an output data area to store, respectively, the sequence of instructions, input data, and output data. Runtime engine 314 can receive input data (e.g., from a host device) and weights (e.g., from the instruction file) and store the input data and weights at the input data area. Runtime engine 314 can also store the instructions extracted from the instruction file at the instruction area. Runtime engine 314 can also determine a first set of physical addresses associated with the input data area and a second set of physical addresses associated with the output data area at the selected memory device.

At operation 610, runtime engine 314 may perform placement of memory resources allocated by the compiler engine to the selected memory device, by mapping the memory references to the memory addresses of the staging area assigned at operation 608. For example, runtime engine 314 can create a first mapping between the first set of memory references (associated with the instructions for fetching input data from an external memory) and the first set of physical addresses associated with the input data area at the selected memory device. Runtime engine 334 also creates a second mapping between the second set of memory references (associated with the instructions for storing output data at the external memory) and the second set of physical addresses associated with the output data area at the selected memory device.

There are different ways by which the mappings are created. For example, runtime engine 314 may have assigned a first set of memory addresses for the instruction area, a second set of memory addresses for the input data area, and a third set of memory addresses for the output data area. Runtime engine 314 can then map the memory references sequentially to the set of memory addresses based on the order by which the memory references appear in the instruction file.

At operation 612, runtime engine 314 select one or more neural network processors to execute the set of instructions. The selection can be based on, for example, for example, whether the architecture of the neural network processors supports the execution of the set of instructions included in the instruction file, the availability of the neural network processor, the priority of the neural network processing operations (versus other neural network processing operations), an expected completion time of the neural network processing operations, etc. In some examples, runtime engine 314 can also suspend the neural network operations (e.g., for a different neural network model, for a different host device, etc.) that are underway at the selected neural network processor(s), and control the selected neural network processor(s) to execute the set of instructions. Runtime engine 314 may also move the execution of the set of instructions to a different neural network processor based on the criteria described above, to create a computing environment in which the instructions for neural network processing can be relocated among different neural network processors. In some examples, runtime engine 314 may split the set of instructions among a plurality of neural network processors, to enable parallel execution of the instructions. With these arrangements, the execution of neural network processing operations can become more flexible and can be adapted dynamically to an operation state of a computing environment including the neural network processors.

At operation 614, runtime engine 314 can execute the set of instructions at the selected neural network processor using the staging area of the selected memory device, and the execution can be based on the first mapping and second mapping created at operation 610. For example, runtime engine 334 may provide the first mapping and the second mapping to a DMA engine, which can then perform access to the selected memory device on behalf of the selected neural network processor when the neural network processor executes instructions including the memory references.

FIG. 6B illustrates an example flow diagram of operation 614 of FIG. 6A. At operation 622, runtime engine 334 may retrieve a first instruction of the first subset of instructions from the instruction area of the selected memory device.

At operation 624, runtime engine 314 may control an internal memory of the neural network processor (e.g., state buffer 322) to retrieve first data of the input data from the input data area of an external memory device (e.g., memory device 313) based on a first memory reference (of the first set of memory references) included in the first instruction. In some examples, retrieval of the first data can be through the DMA engine which receives the first mapping and second mapping information from runtime engine 314 prior to the execution of the first instruction.

At operation 626, runtime engine 314 may control the internal memory device to store the first data at a first location. The first location can be indicated in the first instruction.

At operation 628, runtime engine 314 may retrieve a second instruction of the second subset of instructions from the instruction area.

At operation 630, runtime engine 314 may control the computing engine of the neural network processor to retrieve the first data from the first location of the internal memory device.

At operation 632, runtime engine 314 may fetch the second instruction to computing resources (e.g., a computing engine, a post-processor, etc.) of the neural network processor to execute the second instruction. The computing engine may perform computations for the second instruction based on the first data. The post-processor may perform post-processing to generate output data, and store the output data at the internal memory device.

At operation 634, runtime engine 314 may retrieve a third instruction of the third subset of instructions from the instruction area.

At operation 616, runtime engine 314 may control the internal memory device of the neural network processor to write back second data of the output data to the output data area of the selected memory device based on a second memory reference (of the second set of memory references) included in the third instruction. In some examples, the storage of the second data can also be through the DMA engine which receives the first mapping and second mapping information from runtime engine 314 prior to the execution of the third instruction.

Figure 7:
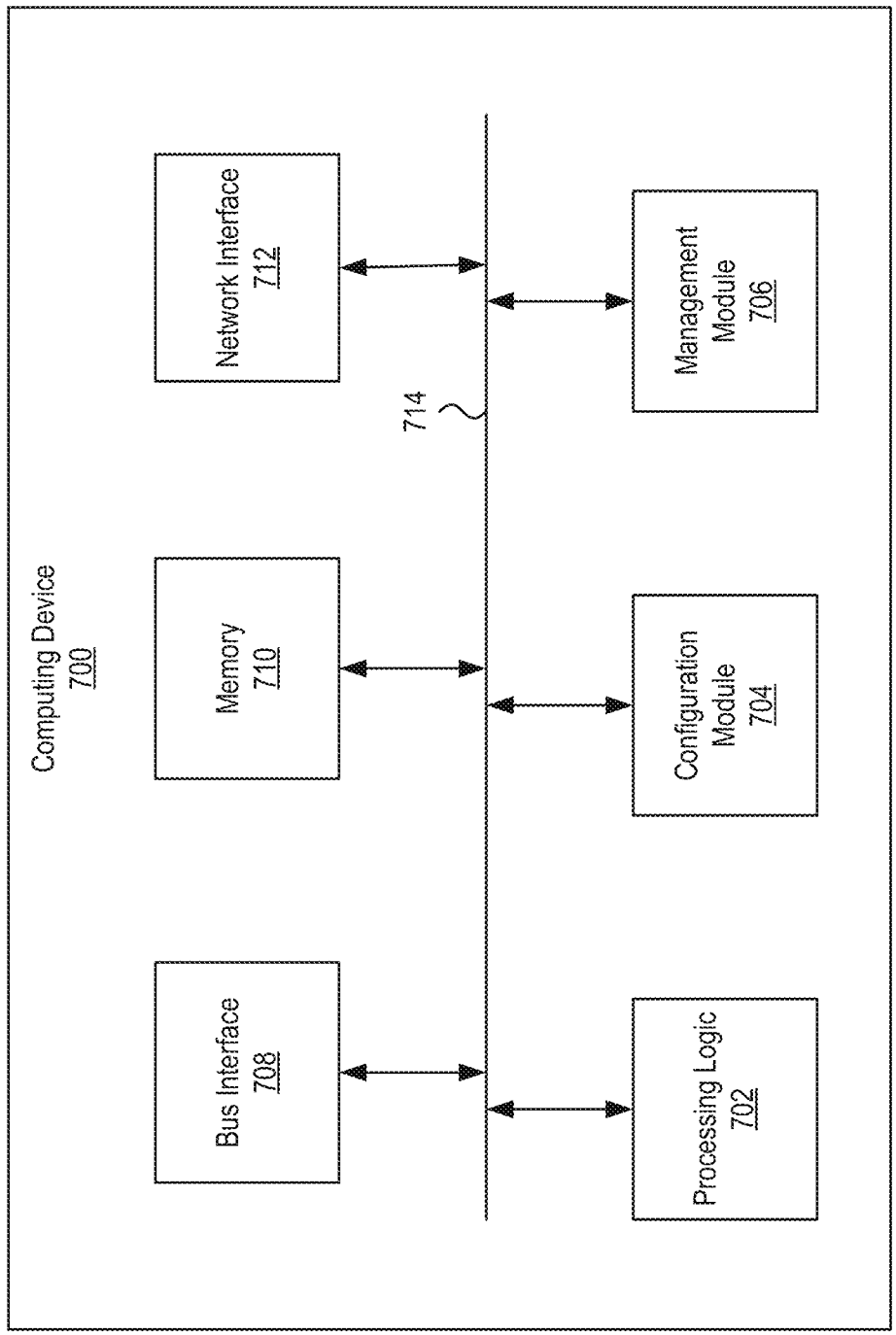
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. A computing device 700 may perform computations to facilitate processing of a task. As an illustrative example, computing device 700 can be part of a server in a multi-tenant compute service system. Various hardware and software resources of computing device 700 (e.g., the hardware and software resources associated with provision of an image recognition service) can be allocated to a client upon request.

In one example, the computing device 700 may include processing logic 702, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710. Processing logic 702 may also include hardware circuities for performing artificial neural network computation including, for example, resource manager 304, neural network processor(s) 306, etc.

The access to processing logic 702 can be granted to a client to provide the personal assistant service requested by the client. For example, computing device 700 may host a virtual machine, on which an image recognition software application can be executed. The image recognition software application, upon execution, may access processing logic 702 to predict, for example, an object included in an image. As another example, access to processing logic 702 can also be granted as part of bare-metal instance, in which an image recognition software application executing on a client device (e.g., a remote computer, a smart phone, etc.) can directly access processing logic 702 to perform the recognition of an image.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory 710 may also store, for example, software applications for performing artificial neural network computation. For example, memory 710 may store software routines related to the computations of the equations above. In a case where processing logic 702 is in the form of FPGA, memory 710 may store netlists data representing various logic circuit components of processing logic 702. In some examples, memory 710 can include memory devices 303 and 313.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 712.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    receiving an instruction file generated by a compiler engine, the instruction file including a set of instructions, the set of instructions including,
        a first subset of instructions to fetch input data from a first location of an external memory to an internal memory of a first neural network processor of a pre-determined architecture,
        a second subset of instructions to fetch input data from the internal memory to an array of processing elements of the first neural network processor and to perform computations corresponding to a sequence of neural network operations at the array of processing elements, and
        a third subset of instructions to store output data of the sequence of neural network operations at a second location of the external memory, the first subset of instructions further including a first set of memory references associated with the first location, and the third subset of instructions including a second set of memory references associated with the second location;
    assigning, at a memory device of a computing system, a first set of physical addresses corresponding to an input data area to store the input data and a second set of physical addresses corresponding to an output data area to store the output data;
    creating a first mapping between the first set of memory references and the first set of physical addresses and a second mapping between the second set of memory references and the second set of physical addresses;
    selecting a second neural network processor of the computing system to execute the set of instructions, the second neural network processor having an identical architecture as the first neural network processor; and
    executing the set of instructions at the second neural network processor using a staging area allocated at the memory device,
    wherein executing the set of instructions comprises retrieving the input data from the input data area based on the first set of memory references and storing the output data in the output data area based on the second set of memory references.

2. The method of claim 1, wherein the second neural network processor comprises a state buffer and an array of processing elements;
    wherein executing the set of instructions further comprises:
        retrieving a first instruction of the first subset of instructions from the staging area;
        retrieving first data of the input data from a first memory location of the input data area based on a first memory reference of the first set of memory references included in the first instruction; and
        storing the first data at a first location of the state buffer based on the first instruction.

3. The method of claim 2, wherein executing the set of instructions further comprises:
    retrieving a second instruction of the second subset of instructions from the staging area;
    determining, based on the second instruction, a first processing element of the second neural network processor to execute the second instruction; and
    controlling the first processing element to retrieve the first data from the first location of the state buffer and perform the sequence of neural network operations for the second instruction based on the first data.

4. The method of claim 2, wherein executing the set of instructions further comprises:
    retrieving a third instruction of the third subset of instructions from the staging area; and
    controlling the state buffer of the second neural network processor to write back second data of the output data to the output data area of the memory device based on a second memory reference of the second set of memory references included in the third instruction.

5. An apparatus comprising:
    a memory device;
    a runtime engine; and
    a neural network processor;
    wherein the runtime engine is configured to:
        receive, from a host device, a request to perform neural network processing of input data using a neural network model, and the input data;
        acquire, based on the request and from a compiler engine, an instruction file including a set of instructions and information about memory space allocated for the neural network processing, the set of instructions being generated based on the neural network model;
        select, based on the information about memory space allocated for the neural network processing, the memory device to support the neural network processing, wherein the memory device is selected from among a set of available memory devices;
        select, based on the set of instructions of the instruction file, the neural network processor to execute the set of instructions, wherein the neural network processor is selected from among a set of available neural network processors;
        map at least part of the memory device to the memory space allocated for the neural network processing; and
        control the neural network processor to execute the set of instructions using the at least part of the memory device.

6. The apparatus of claim 5, wherein the set of instructions includes a first subset of instructions comprising instructions for:
    retrieving the input data from a first pre-determined location of a first memory external to the neural network processor;
    storing the input data in a second memory internal to the neural network processor;

retrieving the input data from the second memory and fetching the input data to an array of processing elements internal to the neural network processor;

performing, at the array of processing elements, computations based on the input data to generate first intermediate output data; and storing the first intermediate output data in the second memory; and wherein the runtime engine is configured to:
map the first pre-determined location of a first memory to a first part of the memory device; and
control the neural network processor to execute the first subset of instructions to retrieve the input data from the first part of the memory device.

7. The apparatus of claim 6, wherein the set of instructions includes a second subset of instructions comprising instructions for:

retrieving second intermediate output data from the second memory;

performing, at the array of processing elements, computations based on the second intermediate output data to generate output data; and storing the output data in a second pre-determined location of the first memory; and wherein the runtime engine is configured to:
map the second pre-determined location of a first memory to a second part of the memory device; and
control the neural network processor to execute the second subset of instructions to store the output data at the second part of the memory device.

8. The apparatus of claim 7, wherein the first subset of instructions include a first set of memory references associated with the first pre-determined location of the first memory; and wherein the second subset of instructions include a second set of memory references associated with the second pre-determined location of the first memory.

9. The apparatus of claim 8, wherein the first set of memory references and the second set of memory references comprise direct memory access (DMA) descriptors.

10. The apparatus of claim 7, wherein the first subset of instructions are associated with a first neural network layer of the neural network model;

wherein the second subset of instructions are associated with a second neural network layer of the neural network model, the second neural network layer receiving output of the first neural network layer as input; and wherein the compiler engine is configured to signal the runtime engine to control the neural network processor to execute the first subset of instructions before the second subset of instructions.

11. The apparatus of claim 10, wherein the compiler engine is configured to:

receive data of a graph representing the neural network model; and determine the first subset of instructions and the second subset of instructions based on the data of the graph.

12. The apparatus of claim 9, wherein the runtime engine is configured to:

determine a first set of memory addresses associated with the input data in the memory device;

determine a second set of memory addresses associated with the output data in the memory device;

determine a first mapping between the first set of memory references and the first set of memory addresses;

determine a second mapping between the second set of memory references and the second set of memory addresses; and provide the first mapping and the second mapping to a DMA controller that manages the memory device.

13. The apparatus of claim 12, wherein the runtime engine is configured to:

obtain a first instruction of the first subset of instructions and a first memory reference included in the first instruction;

provide the first memory reference to the DMA controller to obtain first input data of the input data from the memory device;

provide the first input data to the neural network processor; and control the neural network processor to execute the first instruction based on the first input data.

14. The apparatus of claim 12, wherein the runtime engine is configured to:

obtain a second instruction of the second subset of instructions and a second memory reference included in the second instruction;

control the neural network processor to execute the second instruction to generate first output data of the output data; and store the first output data at the memory device using the DMA controller and based on the second memory reference.

15. The apparatus of claim 5, further comprising a plurality of neural network processors;

wherein the neural network processor is a first neural network processor of the plurality of neural network processors; and wherein the runtime engine is configured to select a first neural network processor from the plurality of neural network processors based on at least one of: an expected execution time of the neural network processing, or availabilities of other neural network processors of the plurality of neural network processors.

16. The apparatus of claim 15, wherein the request is a first request, the input data is first input data, the neural network processing is first neural network processing, and the neural network model is a first neural network model; and wherein the runtime engine is configured to:
receive a second request from the host device to perform second neural network processing of second input data using a second neural network model;
determine a status of execution of the first neural network processing at the first neural network processor;
based on at least one of the status of execution or an expected execution time of the second neural network processing, suspend the execution of the first neural network processing at the first neural network processor; and
perform the second neural network processing at the first neural network processor.

17. The apparatus of claim 16, wherein:

the status of execution of the first neural network processing indicates that computations associated with a neural network layer of the first neural network model have been completed; and the expected execution time of the second neural network processing is shorter than expected execution time of remaining computations for the first neural network processing.

18. A method comprising:
receiving a neural network model;
determining information related to input data to be processed by the neural network model;
receiving information about processing resources of a neural network processor;
determining a sequence of neural network operations based on data dependency in the neural network model;
determining a set of instructions to map the sequence of neural network operations to the processing resources of the neural network processor;
determining, based on a set of memory access operations included in the set of instructions, a first set of memory references associated with a first location of an external memory to store the input data and a second set of memory references associated with a second location of the external memory to store output data;
generating an instruction file including the set of instructions, the first set of memory references and the second set of memory references.

19. The method of claim 18, wherein the set of instructions includes: a first subset of instructions to fetch the input data from the first location of the external memory to an internal memory of the neural network processor, a second subset of instructions to perform computations corresponding to the sequence of neural network operations, and a third subset of instructions to store the output data at the second location of the external memory, the first subset of instructions including the first set of memory references associated with the first location, and the third subset of instructions including the second set of memory references associated with the second location;
   wherein the neural network processor includes a state buffer and an array of processing elements;
   wherein the first subset of instructions comprise instructions to control the state buffer to retrieve the input data from the first location;
   wherein the second subset of instructions comprise instructions to control the array of processing elements to retrieve the input data from the state buffer and perform arithmetic operations on the input data; and
   wherein the third subset of instructions comprise instructions to control the state buffer to write back the output data to the external memory.

20. The method of claim 18, wherein the neural network model comprises a graph of processing nodes of multiple neural network layers;
   wherein the graph specifies data dependency among the multiple neural network layers; and
   wherein the sequence of neural network operations are determined based on the data dependency.

* * * * *